(12) United States Patent
Ding et al.

(10) Patent No.: US 11,405,457 B2
(45) Date of Patent: Aug. 2, 2022

(54) INTELLIGENT FILE ACCESS SYSTEM

(71) Applicant: Citrix Systems, Inc., Fort Lauderdale, FL (US)

(72) Inventors: Jian Ding, Nanjing (CN); Hengbo Wang, Nanjing (CN); Feng Tao, Nanjing (CN); Daowen Wei, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/140,543

(22) Filed: Jan. 4, 2021

(65) Prior Publication Data

US 2022/0182447 A1 Jun. 9, 2022

Related U.S. Application Data

(63) Continuation of application No. PCT/CN2020/134480, filed on Dec. 8, 2020.

(51) Int. Cl.
*H04L 67/1097* (2022.01)
*G06N 20/00* (2019.01)
*G06K 9/62* (2022.01)

(52) U.S. Cl.
CPC ........ *H04L 67/1097* (2013.01); *G06K 9/6218* (2013.01); *G06K 9/6232* (2013.01); *G06N 20/00* (2019.01)

(58) Field of Classification Search
CPC .... G06F 16/93; G06F 16/906; G06F 16/9535; G06K 9/6218; G06K 9/6232; G06N 20/00; G06N 20/10; G06N 20/20; H04L 65/22; H04L 67/1097
See application file for complete search history.

(56) References Cited

U.S. PATENT DOCUMENTS

| | | | |
|---|---|---|---|
| 10,614,364 B2 | 4/2020 | Krumm et al. | |
| 10,652,311 B2 | 5/2020 | Kennedy et al. | |
| 2007/0239712 A1* | 10/2007 | Chen | G06F 16/156 |
| 2012/0059780 A1* | 3/2012 | Kononen | H04M 1/72403 |
| | | | 706/14 |

(Continued)

FOREIGN PATENT DOCUMENTS

| | | |
|---|---|---|
| CN | 1748218 A | 3/2006 |
| CN | 105224681 A | 1/2016 |

(Continued)

OTHER PUBLICATIONS

Extended European Search Report dated Apr. 25, 2022 for European Patent Application No. 21205709.5.

(Continued)

*Primary Examiner* — Caroline H Jahnige
(74) *Attorney, Agent, or Firm* — Pierce Atwood LLP

(57) ABSTRACT

One disclosed method involves determining first data indicative of a context of one or more client devices in response to access of a first file by the one or more client devices, and determining, subsequent to the access of the first file by the one or more client devices, second data indicative of a current context of a first client device. Based at least in part on the first data and the second data being of a first context type, at least one command is generated that causes the first client device to present an indication that the first file is available for access.

19 Claims, 16 Drawing Sheets

(56) References Cited

U.S. PATENT DOCUMENTS

| | | |
|---|---|---|
| 2013/0132138 A1 | 5/2013 | Doganata et al. |
| 2013/0241944 A1 | 9/2013 | Lin et al. |
| 2013/0290110 A1 | 10/2013 | LuVogt et al. |
| 2013/0346406 A1* | 12/2013 | Rupp ............ G06F 9/453 707/736 |
| 2014/0025712 A1 | 1/2014 | Chisa et al. |
| 2015/0254330 A1 | 9/2015 | Chan et al. |
| 2015/0310072 A1* | 10/2015 | Dietz ............ G06F 16/22 707/741 |
| 2017/0109357 A1 | 4/2017 | Gupta et al. |
| 2018/0067959 A1* | 3/2018 | Sorvillo ............ G06F 16/156 |
| 2019/0354410 A1 | 11/2019 | Baldasaro et al. |
| 2020/0104334 A1 | 4/2020 | Khanna et al. |
| 2020/0153694 A1 | 5/2020 | Savalle et al. |
| 2020/0311028 A1 | 10/2020 | Korepanov et al. |
| 2020/0394455 A1 | 12/2020 | Lee et al. |
| 2020/0410001 A1 | 12/2020 | Sarkissian |
| 2021/0365806 A1* | 11/2021 | Sumanth ............ G06F 16/24575 |

FOREIGN PATENT DOCUMENTS

| | | |
|---|---|---|
| CN | 105893390 A | 8/2016 |
| CN | 106293964 A | 1/2017 |
| EP | 3577573 A1 | 12/2019 |

OTHER PUBLICATIONS

United States U.S. Appl. No. 17/023,582, filed Sep. 17, 2020.
United States U.S. Appl. No. 17/022,570, filed Sep. 16, 2020.
International Search Report and Written Opinion dated May 28, 2021 for International Patent Application No. PCT/CN202/110931.
International Search Report and Written Opinion dated May 27, 2021, for International Patent Application No. PCT/CN2020/113218.
Office Action dated Mar. 14, 2022 for U.S. Appl. No. 17/022,570.

* cited by examiner

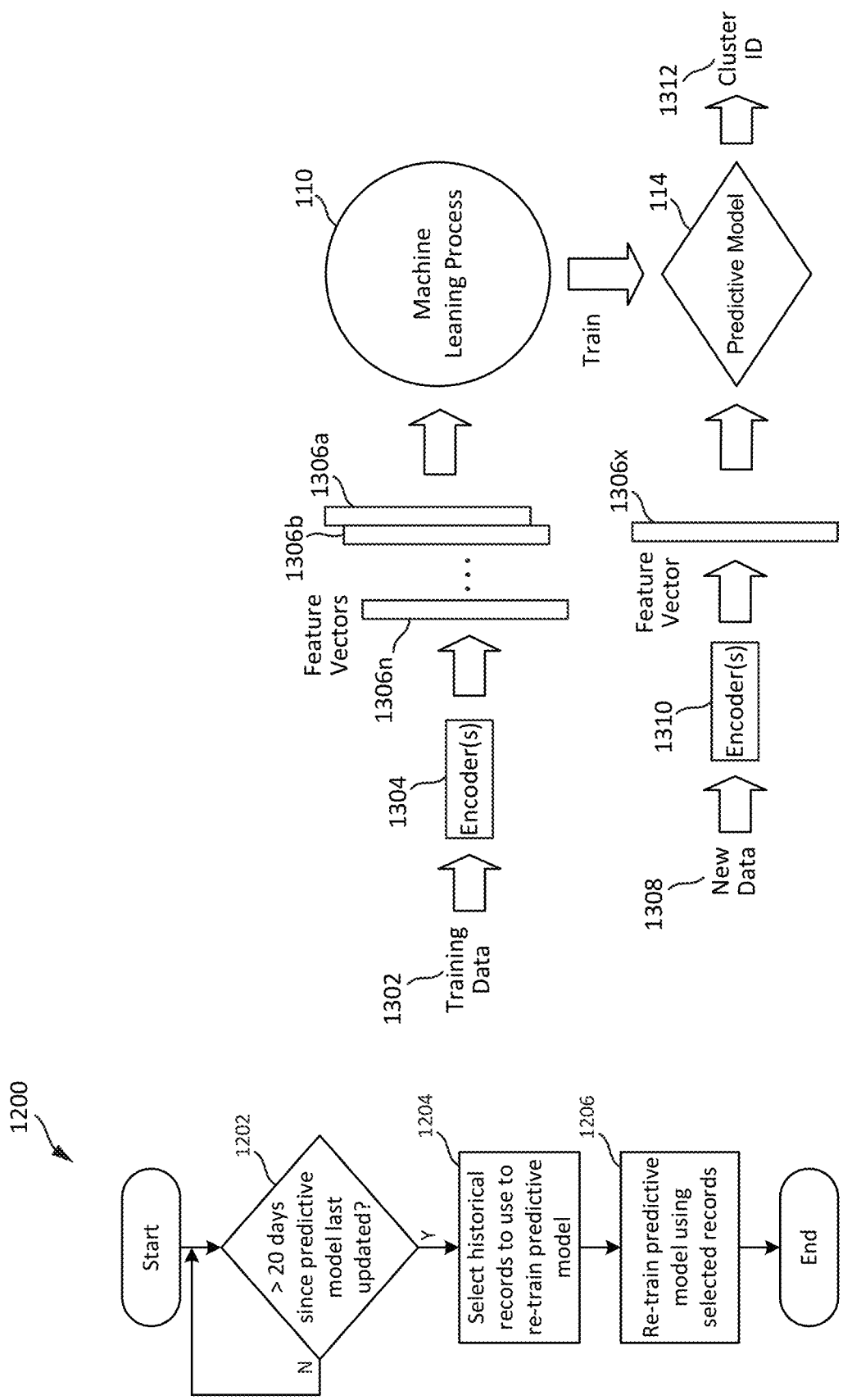

INTELLIGENT FILE ACCESS SYSTEM

CROSS-REFERENCE TO RELATED APPLICATIONS

This application is a continuation of and claims the benefit under 35 U.S.C. § 120 and 35 U.S.C. § 365(c) to International Application PCT/CN134480, entitled INTELLIGENT FILE ACCESS SYSTEM, with an international filing date of Dec. 8, 2020, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves determining first data indicative of a context of one or more client devices in response to access of a first file by the one or more client devices, and determining, subsequent to the access of the first file by the one or more client devices, second data indicative of a current context of a first client device. Based at least in part on the first data and the second data being of a first context type, at least one command is generated that causes the first client device to present an indication that the first file is available for access.

In some embodiments, a system may include at least one processor, and at least one computer-readable medium encoded with instructions which, when executed by the at least one processor, cause the system to determine first data indicative of a context of one or more client devices in response to access of a first file by the one or more client devices, to determine, subsequent to the access of the first data by the one or more client devices, second data indicative of a current context of a first client device, the second data being of the first context type, and to generate, based at least in part on the first data and the second data being of a first context type, at least one command that causes the first client device to present an indication that the first file is available for access.

In some embodiments, a method involves determining that one or more client devices accessed a first file from a first resource, and determining that the one or more client devices accessed a second file from a second resource, the second resource being separate and distinct from the first resource. Based at least in part on the one or more client devices having accessed the first file and the second file, at least one command is generated that causes a first client device to present an indication that the first file and the second file are accessible using the first client device.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 11 shows an example table that the file access monitoring service shown in FIG. 6 may populate with contextual data for accessed notifications;

FIG. 12 shows an example routine that may be performed by the context classifier training service shown in FIG. 6;

FIG. 13 shows an example technique that the context classifier training service shown in FIG. 6 may use to train and/or update a predictive model for use by the context-based file access forecasting service and the context-based file presentation service;

DETAILED DESCRIPTION

Figure 1A:
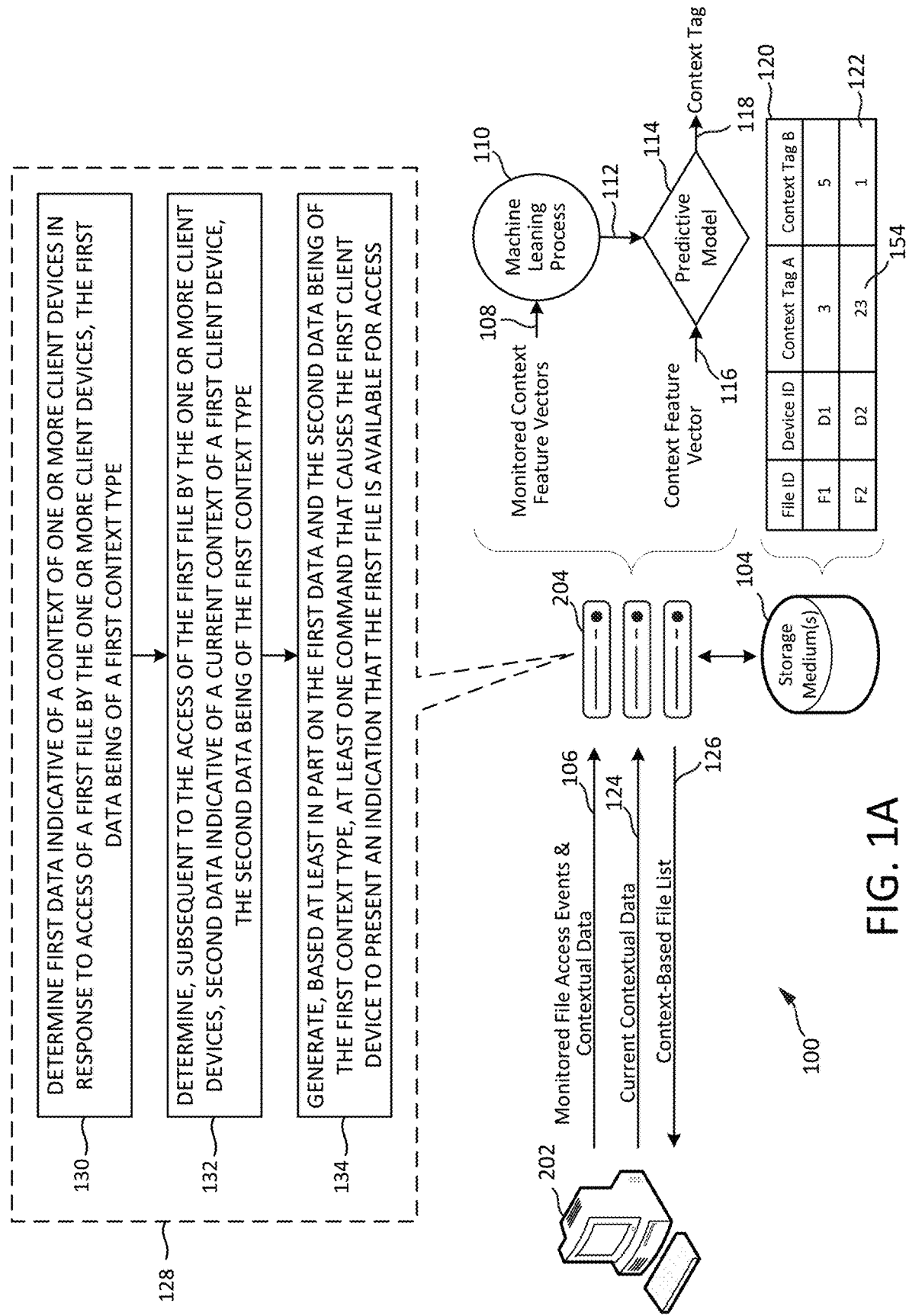
FIG. 1A shows a high-level example implementation of an intelligent file access system configured in accordance with some aspects of the present disclosure.

For purposes of reading the description of the various embodiments below, the following descriptions of the sections of the specification and their respective contents may be helpful:

Section A provides an introduction to example embodiments of an intelligent file access system;

Section B describes a network environment which may be useful for practicing embodiments described herein;

Section C describes a computing system which may be useful for practicing embodiments described herein;

Section D describes embodiments of systems and methods for accessing computing resources using a cloud computing environment;

Section E describes embodiments of systems and methods for managing and streamlining access by clients to a variety of resources;

Section F provides a more detailed description of example embodiments of the intelligent file access system that was introduced in Section A; and Section G describes example implementations of methods, systems/devices, and computer-readable media in accordance with the present disclosure.

A. Introduction to Illustrative Embodiments of an Intelligent File Access System The multi-resource accesses system 500 described in Section E below (in connection with FIGS. 5A-D) provides many benefits, including providing a user 524 (shown in FIGS. 5B and 5C) with the ability to seamlessly access any of a number of resources from a user interface of a single application, e.g., the resource access application 522 shown in FIGS. 5B and 5C. The display screen 540 shown in FIG. 5D illustrates example features that may presented to the user 524 via such a user interface.

As Section E describes (in connection with FIG. 5D), the user interface presented by the resource access application 522 may, among other things, permit the user 524 to click on or otherwise select a "files" user interface element 556 to obtain a drop-down menu identifying various options for selecting a file to be accessed. As shown below the user interface element 556 (in FIG. 5D), for example, such options may enable the user 524 to readily access files that are stored within (A) various file repositories located on the client device 202 itself, (B) one or more shared folders, network drives, or other network locations accessible to the client device 202, and/or (C) one or more cloud-based file repositories, such as the ShareFile® system offered by Citrix Systems, Inc.

Figure 5A:
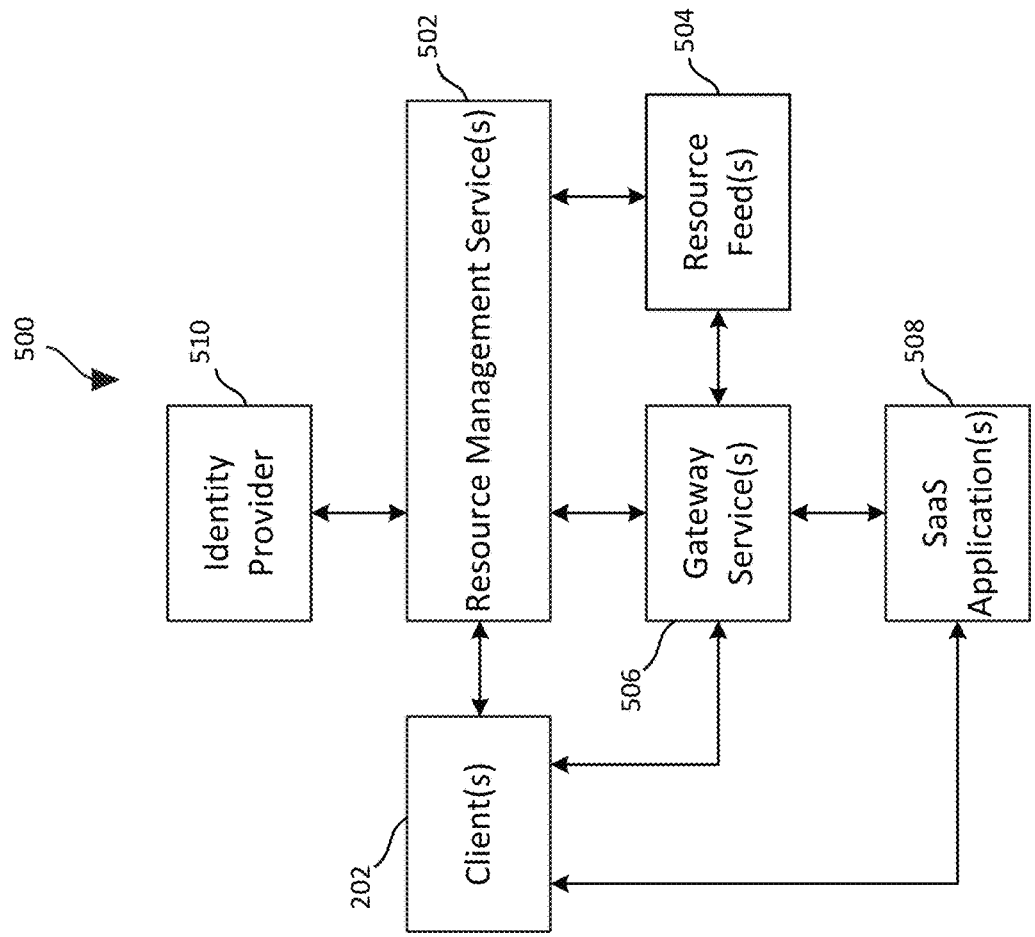
FIG. 5A is a block diagram of an example system in which resource management services may manage and streamline access by clients to resource feeds (via one or more gateway services) and/or software-as-a-service (SaaS) applications.
Figure 5B:
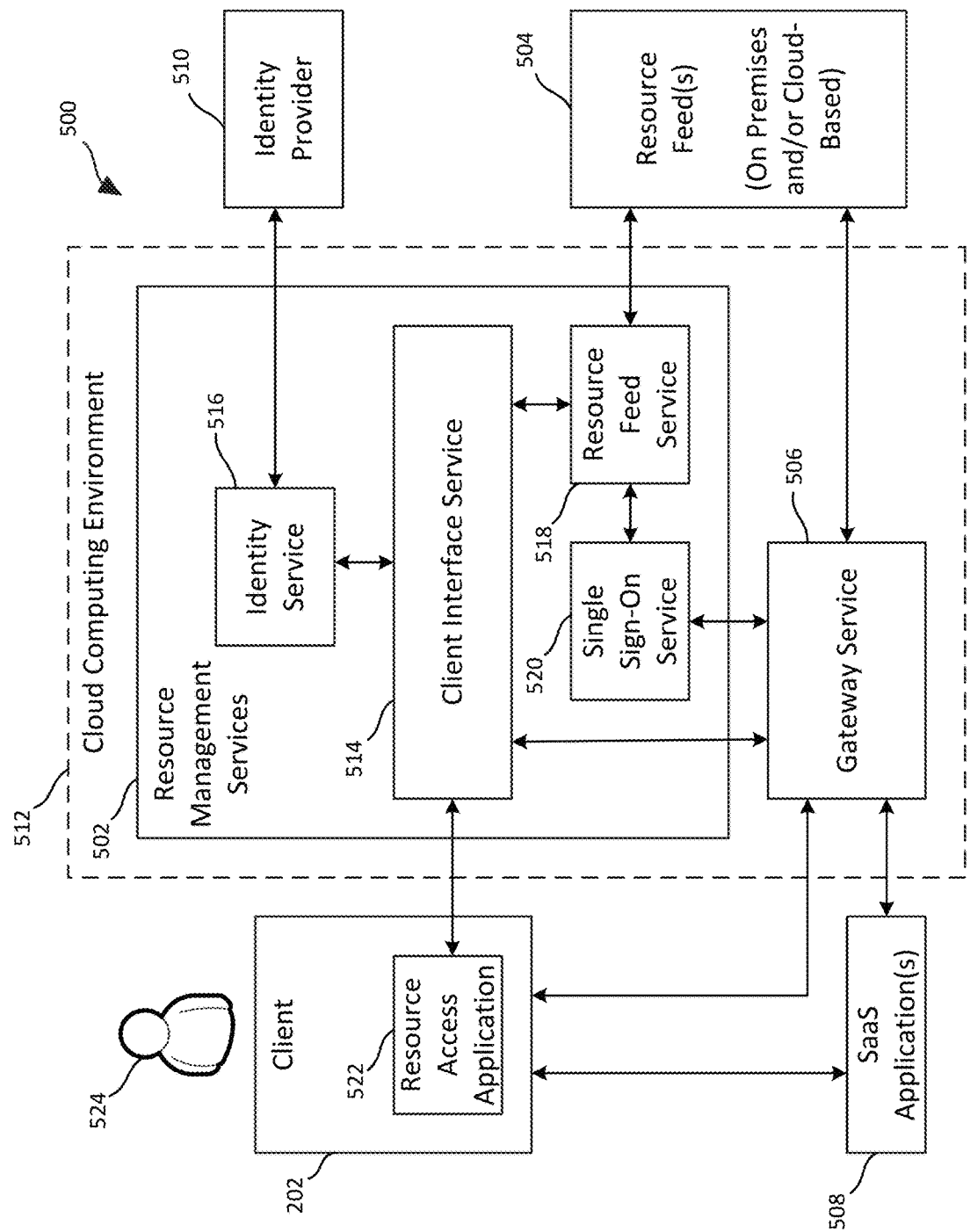
FIG. 5B is a block diagram showing an example implementation of the system shown in FIG. 5A in which various resource management services as well as a gateway service are located within a cloud computing environment.
Figure 5C:
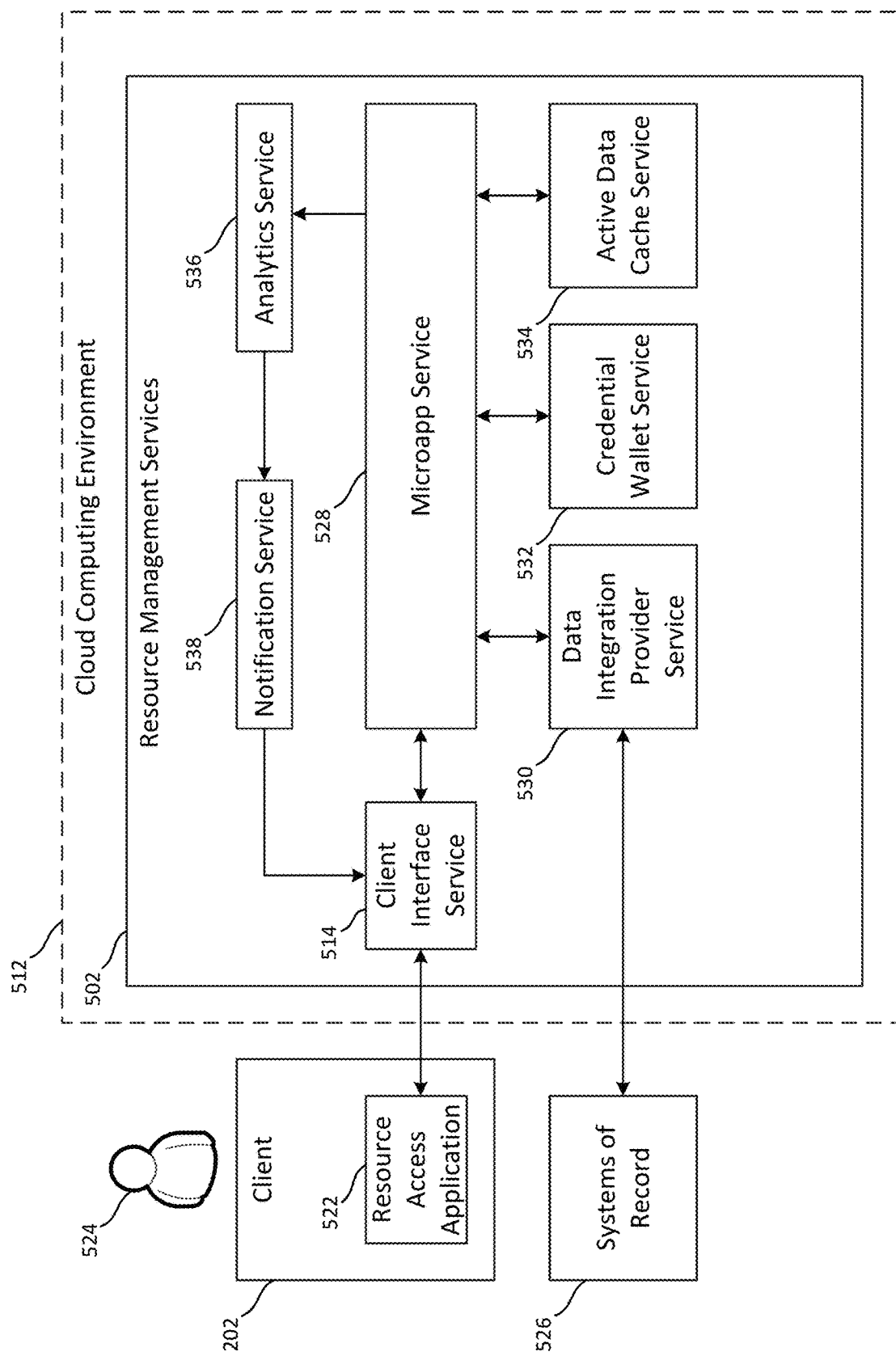
FIG. 5C is a block diagram similar to that shown in FIG. 5B but in which the available resources are represented by a single box labeled "systems of record," and further in which several different services are included among the resource management services.
Figure 5D:
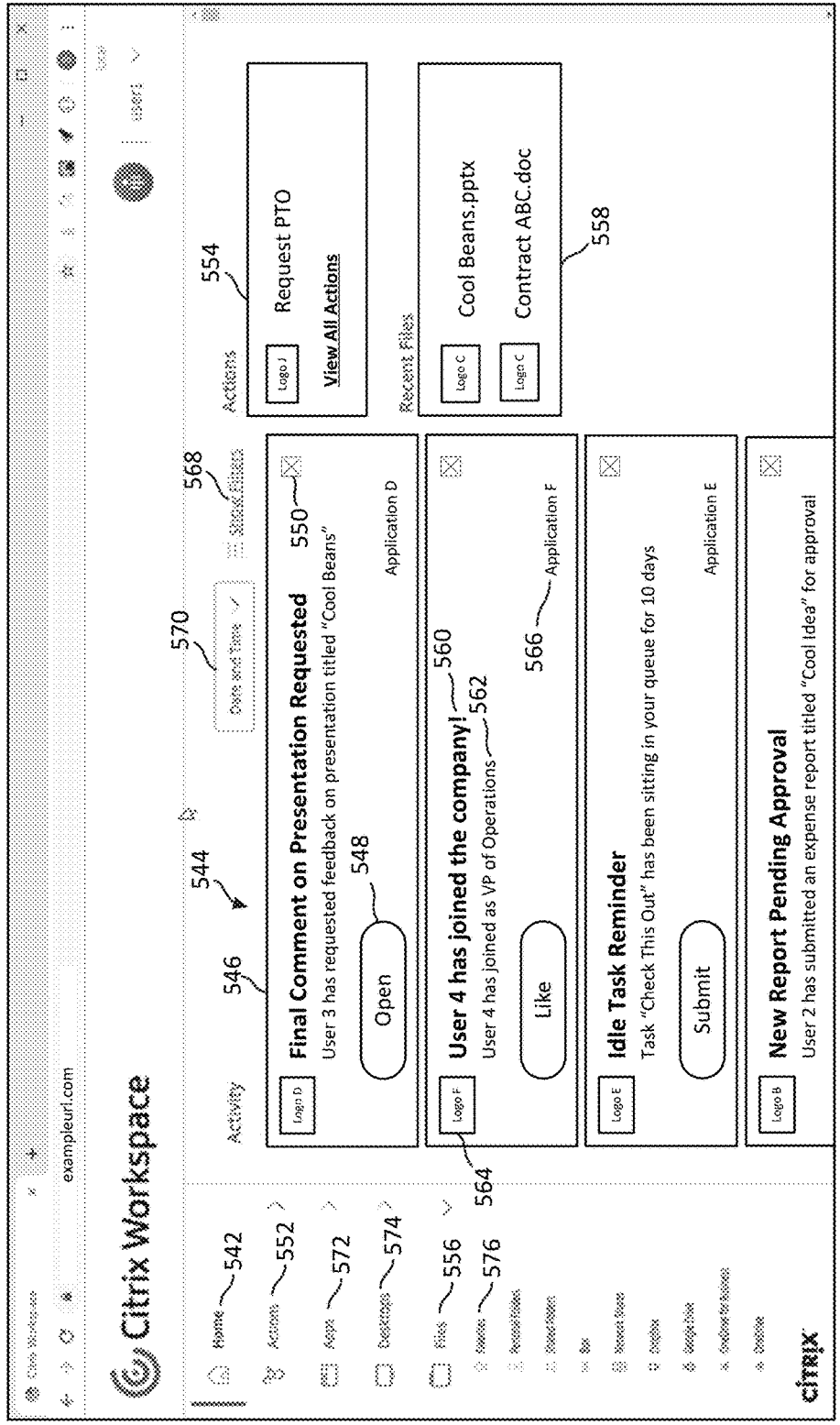
FIG. 5D shows how a display screen may appear when an intelligent activity feed feature of a multi-resource management system, such as that shown in FIG. 5C, is employed.

Further, as also shown in FIG. 5D, in some implementations, the multi-resource access system 500 may additionally or alternatively identify on the screen 540 a list 558 of files that were recently accessed using a file sharing system, such as ShareFile®.

The inventors have recognized and appreciated that even with the availability of the file access tools shown in FIG. 5D, a user may still have difficulty locating a desired file in at least some circumstances. For example, the inventors have recognized and appreciated that, although a user may create a list of the user's "favorite" files by manually identifying files stored in one or more different repositories (e.g., a "documents" folder on the client device, a shared folder on a network drive, a cloud-based file sharing service, etc.), and may thereafter access those files by selecting a "favorites" option 576 (e.g., via the drop down menu of the "files" user interface element 556), some users may find it burdensome to have to create such a "favorites" list and/or keep such a list current. The inventors have additionally recognized and appreciated that the files is a particular repository, e.g., ShareFile®, that are identified in the list 558 of recently accessed files may represent only a subset of the files that the user may desire to access. As such, the list 558 may not identify a recently accessed file the user might want to access again, simply because that file happens to be stored in a repository other than that to which the list 558 relates. And still further, the inventors have recognized and appreciated that the files a given user is likely to access at a particular time will often depend on the current context of the client device 202 that user is operating. For example, a given user may have accessed a first file several times over the course of a weekend while at home using a smartphone, and may have accessed a second file several times during the workweek while in the office operating a desktop computer. Accordingly, identifying the first file on the user's recently accessed files list 558 while the user is in the office during the workweek and operating a desktop computer may not be beneficial, as it is unlikely the user will desire to access the first file in such contextual scenario.

Figure 1B:
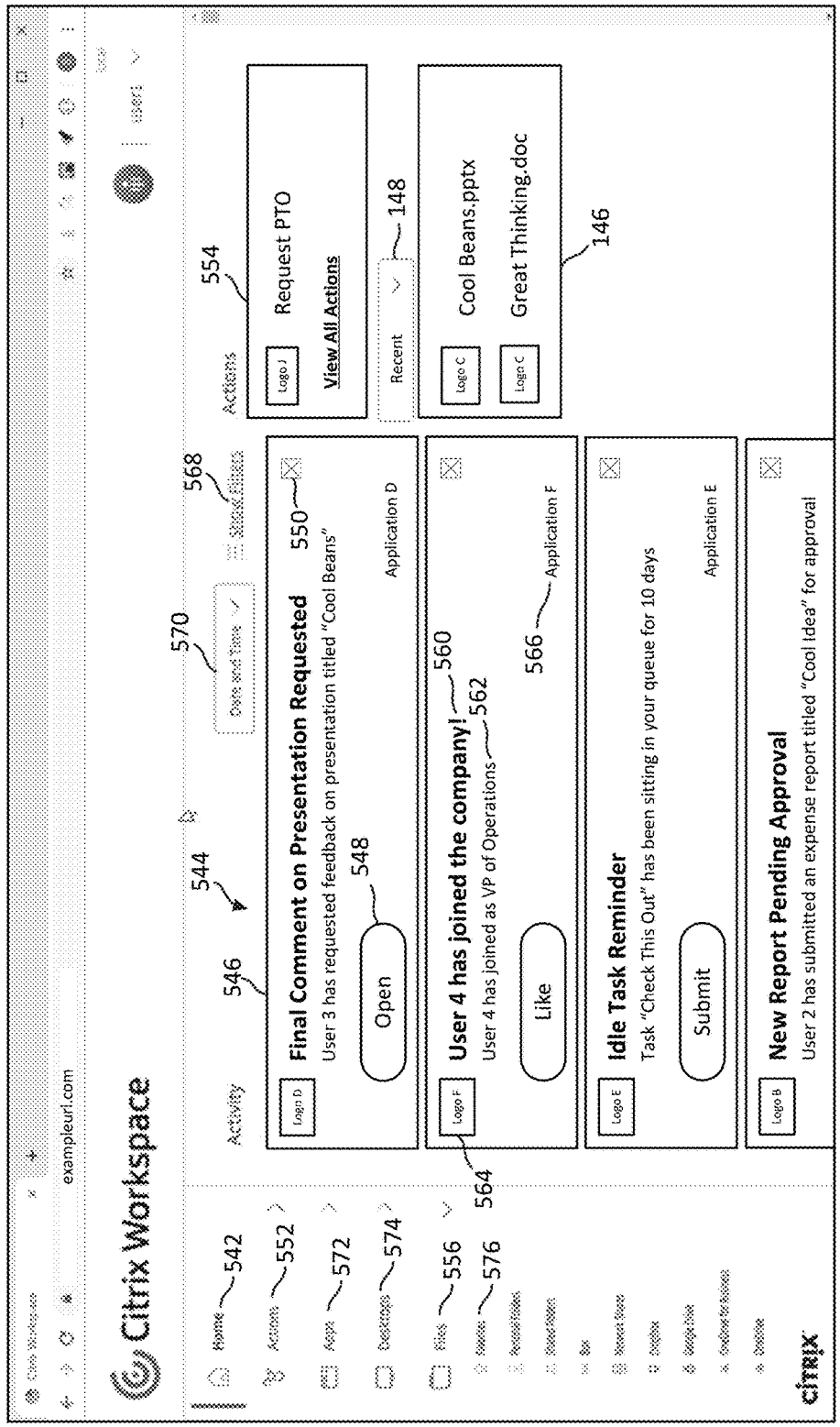
FIG. 1B shows a first example screen that may be presented by a client device of the intelligent file access system shown in FIG. 1A.
Figure 1C:
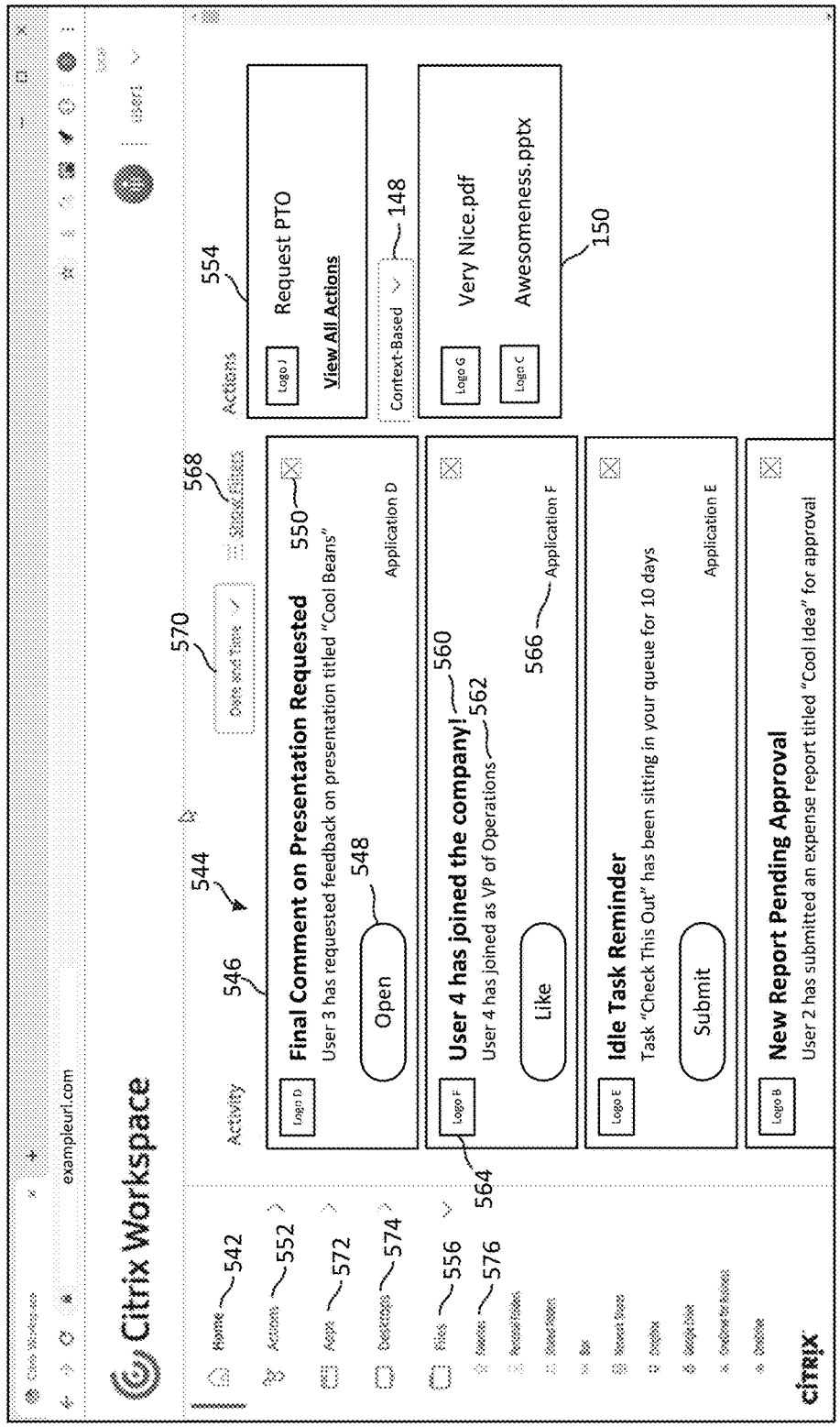
FIG. 1C shows a second example screen that may be presented by a client device of the intelligent file access system shown in FIG. 1A.

Offered is an intelligent file access system 100 (an example of which is shown in FIG. 1A) that is configured to monitor occasions on which a client device 202 accesses files (referred to herein as "file access events") and to send data concerning such file access events to one or more servers 204 (as indicated by arrow 106) for subsequent use in identifying files to include in a list of available files for presentation to a user (e.g., in a recently accessed files list 146, such as that illustrated in FIG. 1B and/or in a context-based file list 150, such as that shown in FIG. 1C). As shown, the system 100 may include one or more databases or other storage mediums 104 to store the accumulated data concerning file access events. Examples of techniques that can be used to evaluate the data accumulated in the storage medium(s) 104 to generate one or more lists of files that can be sent to the client device 202 (e.g., as indicated by arrow 126) to facilitate a user's ability to locate and/or access one or more desired files are described in detail below.

In some implementations, file access events for files stored in multiple different repositories may be tracked, and the data accumulated by such tracking (e.g., as stored in the storage medium(s) 104) may be used to generate lists of recently and/or commonly accessed files for presentation to the user 524. For example, as shown in FIG. 1B, in some implementations, a screen 144 may be presented on the client device 202 (e.g., as generated by the resource access application 522 shown in FIG. 5C) that includes a list 146 of recently and/or commonly accessed files from multiple different repositories, rather than from only a single repository, such as ShareFile®. For example, as FIG. 1B illustrates, the list 146 of the files that were most recently accessed (from any of multiple sources) via one or more resource access applications 522 operated by a user may be presented in response to the user selecting a "recent" option via a user interface element 148. Additionally or alternatively, selecting a "common" or "frequent" option via the user interface element 148 may instead cause the list 146 to identify the files (from any of multiple repositories) that were accessed via one or more resource access applications 522 operated by the user the most frequently over some recent period of time, e.g., the last fourteen days.

In some implementations, the intelligent file access system 100 may additionally or alternatively take into account the context of the client device 202 both when file access events (from a single repository or multiple repositories) are detected and when a context-based file list 150 (shown in FIG. 1C) of files is to be presented to a user, to identify the files that are most likely to be relevant to the user in a given context. For instance, as indicated by the arrow 106 in FIG. 1A, in some implementations, contextual data concerning the client device 202 when file access events are detected may additionally also be sent to the server(s) 204 for storage in the storage medium(s) 104. Examples of such contextual data that may be so determined and recorded include (A) a device ID identifying the particular client device 202 used to access the file, (B) the date and/or time the client device 202 was used to access the file, (C) a network ID identifying the network to which the client device 202 was connected at the time the file was accessed, (D) a location (e.g., latitude and longitude) of the client device 202 at the time it was used to access the file. In such an implementation, the system 100 can take a user's historical behavior patterns with respect to accessing files in particular contextual situations into account when determining which files to include on the context-based file list 150 in a current contextual scenario.

As show in FIG. 1A, once a sufficient amount of contextual data has been accumulated for various file access events by a user 524, the system 100 may convert the contextual data for respective file access events into feature vectors 108 (e.g., using one or more encoders—not shown in FIG. 1A), with the contextual data of file access events being represented by a respective multi-dimensional feature vector 108. As used herein, a "feature vector" for determined contextual data refers to a set of one or more discrete values representing respective characteristics of the contextual data. The system 100 may then provide such feature vectors 108 to a machine learning process 110. In some implementations, the machine learning process 110 may perform an unsupervised machine learning technique to identify clusters of data points in a multi-dimensional space. The dimensions of a given feature vector 108 in the multi-dimensional space may, for example, correspond to the respective pieces of contextual data that were determined for a particular file access event. For example, a first dimension of the feature vector may correspond to the device ID identifying the particular client device 202 used to access the file, a second dimension of the feature vector may correspond to the date and/or time the client device 202 was used to access the file, a third dimension of the feature vector may correspond to the network ID identifying the network to which the client device 202 was connected at the time the file was accessed, and a fourth dimension of the feature vector may correspond to a location (e.g., latitude and longitude) of the client device 202 at the time it was used to access the file. Because such clusters are generally determined based on the relative proximity of the data points in the multi-dimensional space, the data points in a given cluster tend to have similar feature sets as the other data points in that same cluster.

As indicated by arrow 112, the machine learning process 110 may be used to train a predictive model 114 to categorize respective input feature vectors 116 into one of the clusters of data points that were identified using the clustering technique. Once it is properly trained, the predictive model 114 may be used to assign labels or tags, referred to herein as "context tags," to the file access event records stored in the storage medium(s) 104. In particular, for respective ones of the file access event records, the stored contextual information for the record may be converted into a feature vector 116, e.g., using one or more encoders, that is then provided to the predictive model 114 for classification into a particular cluster. As illustrated in FIG. 1A, the predictive model 114 may, for example, output context tags 118 corresponding to the clusters into which it classifies the input feature vectors 116. Additional details concerning example techniques for training and using the predictive model 114 to assign context tags to feature vectors representing contextual data sample sets are provided below in connection with FIG. 13.

In some implementations, the system 100 may periodically (e.g., once per day) evaluate at least some of the recorded file access event records, including the context tags 118 applied to them by the predictive model 114, to determine scores (e.g., "context-based file access forecast scores") for the possible combinations of files, client devices and context tags that are reflected in the evaluated data sets for respective users 524. In some implementations, for example, the system 100 may use the recorded file access event records for a set period of time (e.g., the last twenty days) to determine the context-based file access forecast scores for respective users 524.

FIG. 1A shows an example table 120 that may be used to record the determined context-based file access forecast scores for a particular user 524. In some implementations, the respective context-based file access forecast scores may simply reflect, for respective file/device combinations represented in the data set being considered, the total number of recorded file access events to which a particular tag was assigned and for which the indicated file was accessible by the indicated device (e.g., by being stored on a local disk of the indicated device or by being stored on a network drive or in cloud-based file repository that is accessible to the indicated device) when the file access event occurred. For example, an entry 154 in the table 120 may reflect that, in the data set under consideration, context tag "A" was assigned to a total of "23" file access event records for file "F2" in circumstances where the file "F2" was accessible by the device "D2." In other implementations, different weights may be applied to different records when determining the context-based file access forecast scores. For example, if records for the last "X" days are being evaluated, lower weights may be applied to older records, so that the more recent records influence the context-based file access forecast scores more than the less recent ones. In some implementations, for example, an exponential moving average (e.g., a first-order infinite response filter that applies weighting factors that decrease exponentially) may be applied to weight the different records differently.

As indicated by arrow 124 in FIG. 1A, after the table 120 has been populated, the system 100 may receive current contextual data from a client device 202 operated by the user 524 for whom the table 120 was generated. In some implementations, for example, the user 524 may have manipulated the user interface element 148 (as shown in FIG. 1C) to select "context-based" as the selection criterion for the to-be-generated list of relevant files. In response to detecting such a selection, the client device 202 may gather the current contextual data of the client device 202 and send it to the server(s) 204 for processing along with a request for a context-based file list 150. Similar to the contextual data that the system 100 accumulated during the file access event monitoring process discussed above, examples of current contextual data that may gathered and sent along with a request for a context-based file list 150 include (A) a device ID identifying the client device 202 sending the request, (B) the current date and/or time, (C) a network ID identifying the network to which the client device 202 is currently connected, and (D) a current location (e.g., latitude and longitude) of the client device 202.

Upon receiving the current contextual data from the client device 202 (e.g., per the arrow 124), the system 100 may encode the current contextual data into a context feature vector 116 and provide that context feature vector 116 to the predictive model 114 for determination of a context tag 118. After the context tag 118 has been determined for the current contextual information, the table 120 may be consulted to determine, based on that determined context tag 118, one or more files that are to be included in the requested context-based file list 150.

In some implementations, the rows in the table 120 including the device ID of the client device 202 requesting a context-based file list 150 may be identified, and, for individual rows, the column of the table 120 corresponding to the determined context tag 118 for the current contextual information may be consulted to determine context-based file access forecast scores for the identified rows. In some implementations, the files (e.g., as indicated by respective "File IDs") for which such context-based file access forecast scores are higher than a threshold value may be selected as the files that are to be included in the requested context-based file list 150. For example, for the context-based file access forecast scores shown in the table 120, if the client device 202 requesting the list 150 was assigned device ID "D2," the threshold score was "2" and the current contextual data was assigned context tag "A," then file "F2" would be selected for inclusion in the requested context-based file list 150, because the context-based file access score (i.e., "23") for that file/device/context tag combination (per table entry 154) is greater than the threshold of "2." If, on the other hand, the client device 202 requesting the list 150 was assigned device ID "D2," the threshold score was "2" and the current contextual data was assigned context tag "B," then file "F2" would not be selected for inclusion in the requested context-based file list 150, because the context-based file access score (i.e., "1") for that file/device/context tag combination (per table entry 122) is less than the threshold of "2."

After the pertinent files for the user 524 requesting the context-based file list 150 have been determined, e.g., based on the entries in the table 120, the system 100 may format the context-based file list 150 for presentation on the client device 202 (e.g., on the screen 152 shown in FIG. 1C). In some implementations, the context-based file access forecast scores may further be used to determine the order in which the identified files appear in the context-based file list 150. For example, the identified files having higher context-based file access forecast scores may, in at least some circumstances, be caused to appear earlier in the context-based file list 150 than those having lower context-based file access forecast scores.

FIG. 1A further shows an example routine 128 that may be executed by the server(s) 204 of the system 100 to perform context-based processing of file access events in accordance with some embodiments. As shown, at a step 130 of the routine 128, the server(s) 204 may determine first data indicative of a context of one or more client devices 202 in response to access of a first file by the one or more client devices 202, the first data being of a first context type. The first data may correspond, for example, to the contextual data that was included in one or more messages indicated by the arrow 106. As discussed above, in some implementations, the system 100 may determine that the first data is of the first context type by evaluating one of more feature vectors 116 representing the first data (e.g., the determined contextual data) using the predictive model 114 to determine one or more context tags 118 for the first data.

At a step 132 of the routine 128, the server(s) 204 may determine, subsequent to the access of the first file by the one or more client devices 202, second data indicative of a current context of a first client device 202, the second data being of the first context type. The second data may, for example, correspond to the current contextual data that may be included in the message 124 that the first client device 202 may send to the server(s) 204, as described above. In some implementations, the system 100 may determine that the second data is of the first context type by evaluating a feature vector 116 representing the second data (e.g., the current contextual data included in the message 124) using the predictive model 114 to determine a context tag 118 for the second data.

At a step 134 of the routine 128, the server(s) 204 may generate, based at least in part on the first data (e.g., the contextual data that was included in one or more messages indicated by the arrow 106) and the second data (e.g., the current contextual data that may be included in the message 124) being of the first context type (e.g., having been assigned the same context tag 118), at least one command that causes the first client device 202 to present an indication that the first file is available for access. The at least one command may, for example, correspond to a command that causes a context-based file list identifying the first file to be communicated to the first client device 202, e.g., as indicated by the arrow 126 in FIG. 1A.

It should be appreciated that, in some implementations, the system 100 need not take contextual data concerning client devices 202 into account when accumulating data concerning file access events or when generating a recently or commonly accessed file list 146 (e.g., as shown in FIG. 1B). To identify recently accessed files (e.g., from any of multiple file repositories) for the list 146, for example, the system may simply identify, in the data set under consideration, the most recent file access events (e.g., based on time stamps associated with the accumulated file access event records) for files that are accessible to the client device 202 making the request.

Further, to identify commonly accessed files for the list 146 (shown in FIG. 1B), it should be appreciated that the table 120 (shown in FIG. 1A) need not include separately calculated file access forecast stores for different file/device/context tag combinations, and may instead include only a single file access forecast score for different file/device combinations. For example, in some implementations, such context-independent file access forecast scores may simply represent, for the data set under consideration, the total number of recorded file access events for which the indicated file was accessible by the indicated device (e.g., by being stored on a local disk of the indicated device or by being stored on a network drive or in cloud-based file repository that is accessible to the indicated device) when the file access event occurred. In other implementations, different weights may be applied to different records when determining such context-independent file access forecast scores, such as by employing exponential moving average (e.g., a first-order infinite response filter that applies weighting factors that decrease exponentially) to weight the different records differently, as noted above. In any event, no matter how such context-independent file access forecast scores are calculated, the system 100 may determine a list 146 of commonly accessed files by identifying the rows of the table 120 (modified to include only a single file access forecast score for each file/device combination) that include the device ID of the requesting client device 202 and selecting one or more of the files indicated in the identified rows for which the context-independent file access forecast scores are the highest.

Additional details and example implementations of embodiments of the present disclosure are set forth below in Section F, following a description of example systems and network environments in which such embodiments may be deployed.

B. Network Environment

Figure 2:
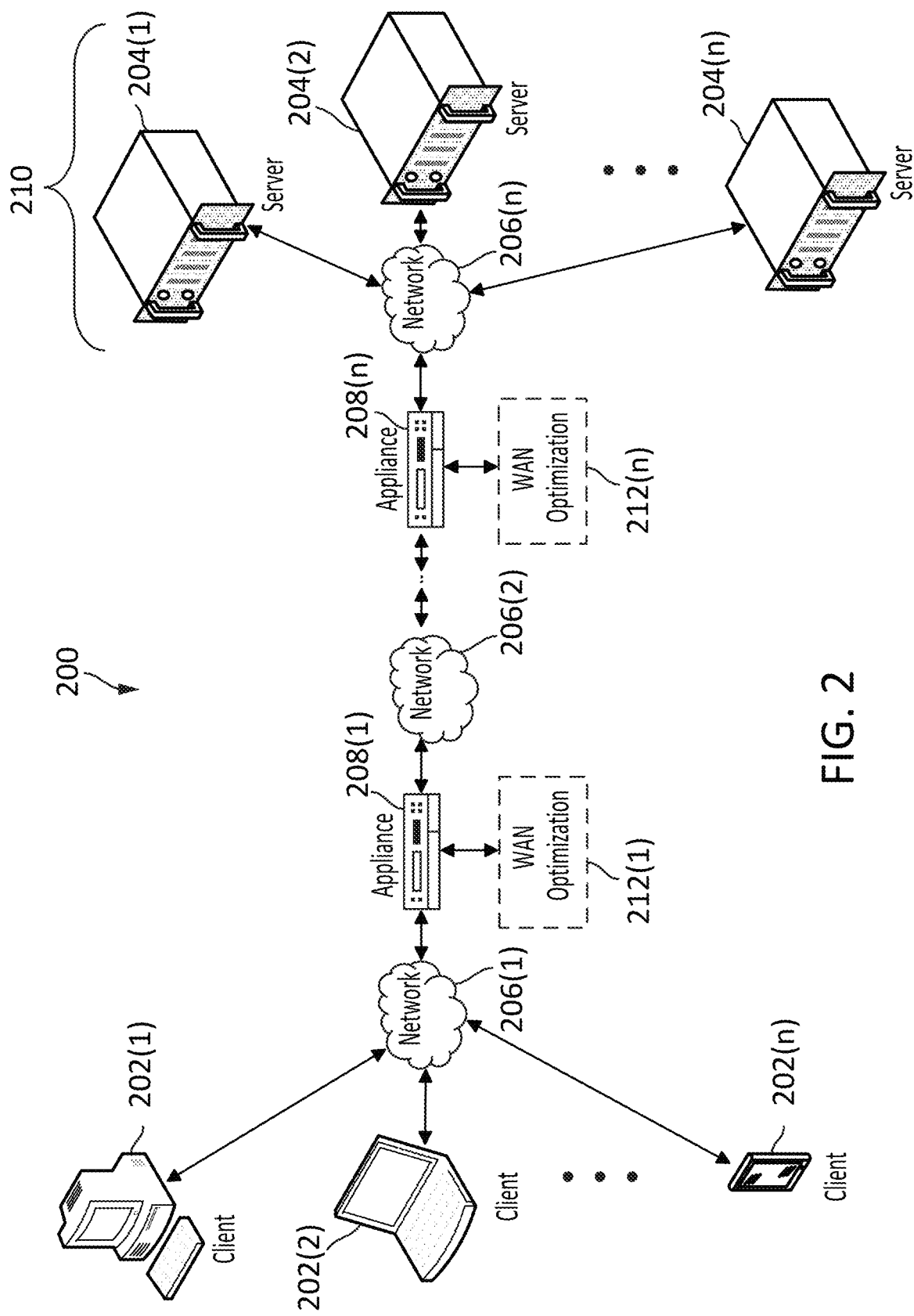
FIG. 2 is a diagram of a network environment in which some embodiments of the context-based notification processing system disclosed herein may be deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
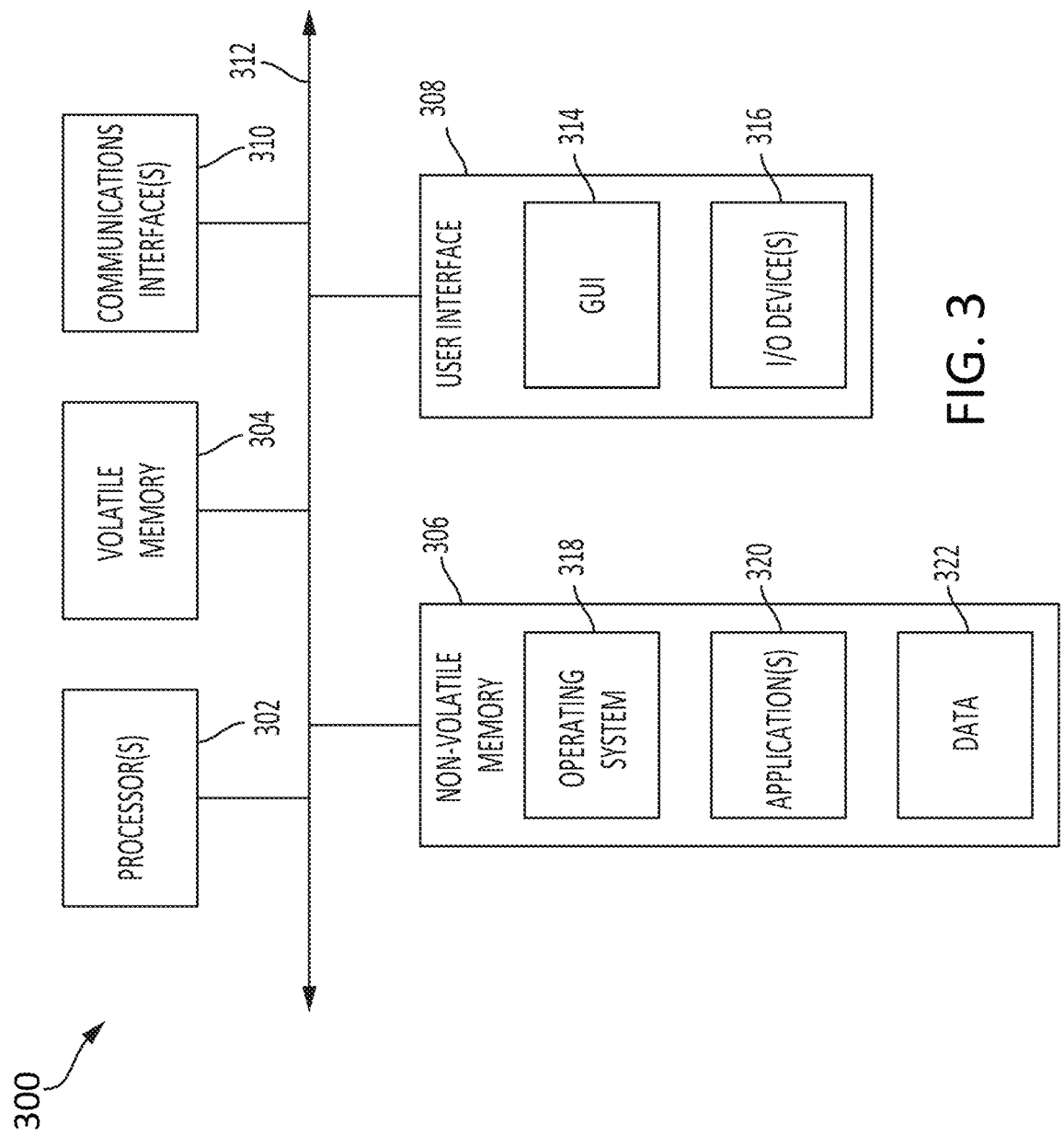
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
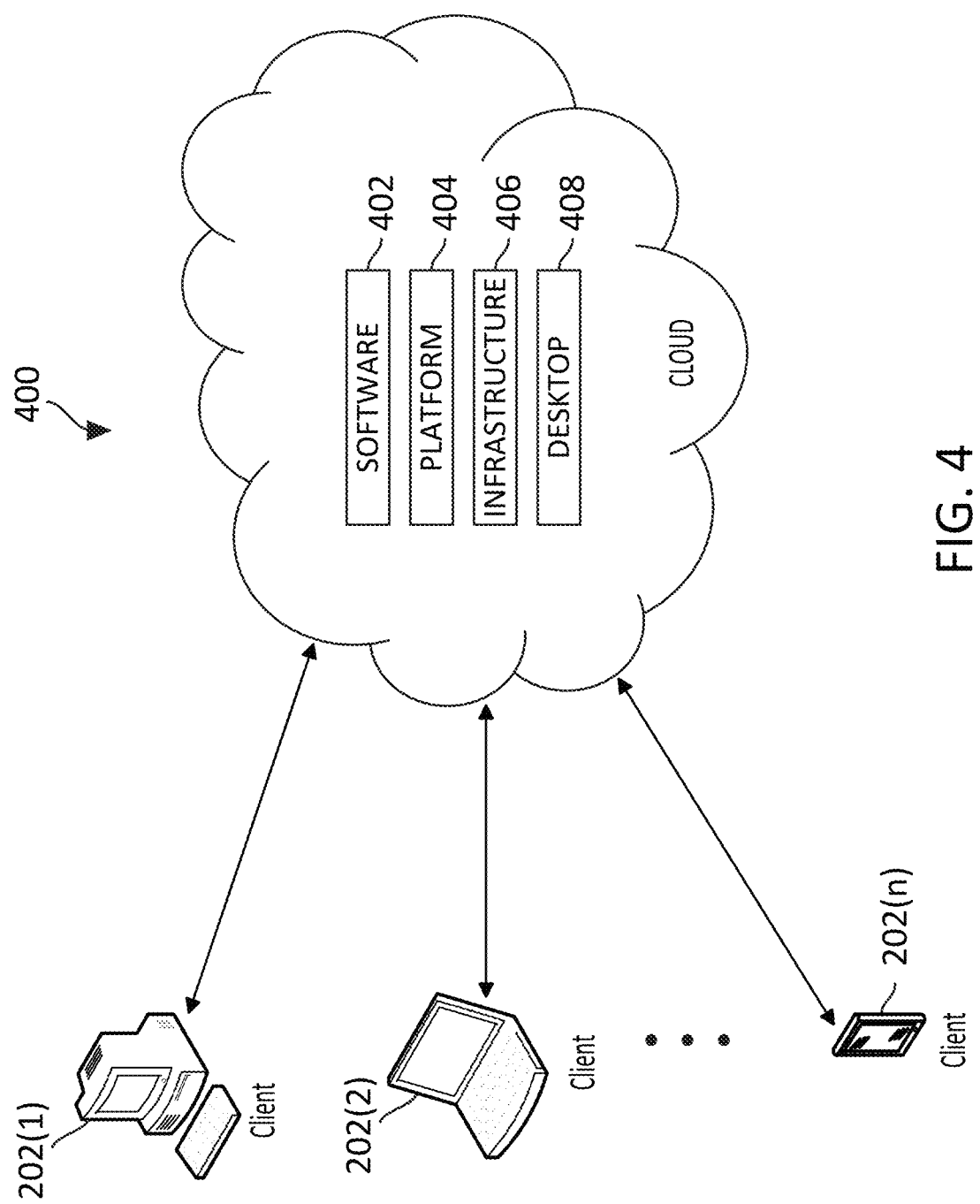
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used.

Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHT-SCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource application is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user interface element 552 or by selecting a desired action from a list 554 of recently and/or commonly used microapp actions. As shown, additional resources may also be accessed through the screen 540 by clicking on or otherwise selecting one or more other user interface elements that may be presented on the screen. For example, in some embodiments, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files. Further, in some embodiments, one or more applications may additionally or alternatively be accessible (e.g., via a Citrix Virtual Apps and Desktops™ service) by clicking on or otherwise selecting an "apps" user interface element 572 to reveal a list of accessible applications or by selecting a desired application from a list (not shown in FIG. 5D but similar to the list 558) of recently and/or commonly used applications. And still further, in some implementations, one or more desktops may additionally or alternatively be accessed (e.g., via a Citrix Virtual Apps and Desktops™ service) by clicking on or otherwise selecting a "desktops" user interface element 574 to reveal a list of accessible desktops or by or by selecting a desired desktop from a list (not shown in FIG. 5D but similar to the list 558) of recently and/or commonly used desktops.

The activity feed shown in FIG. 5D provides significant benefits, as it allows a user to respond to application-specific events generated by disparate systems of record without needing to navigate to, launch, and interface with multiple different native applications.

Figure 6:
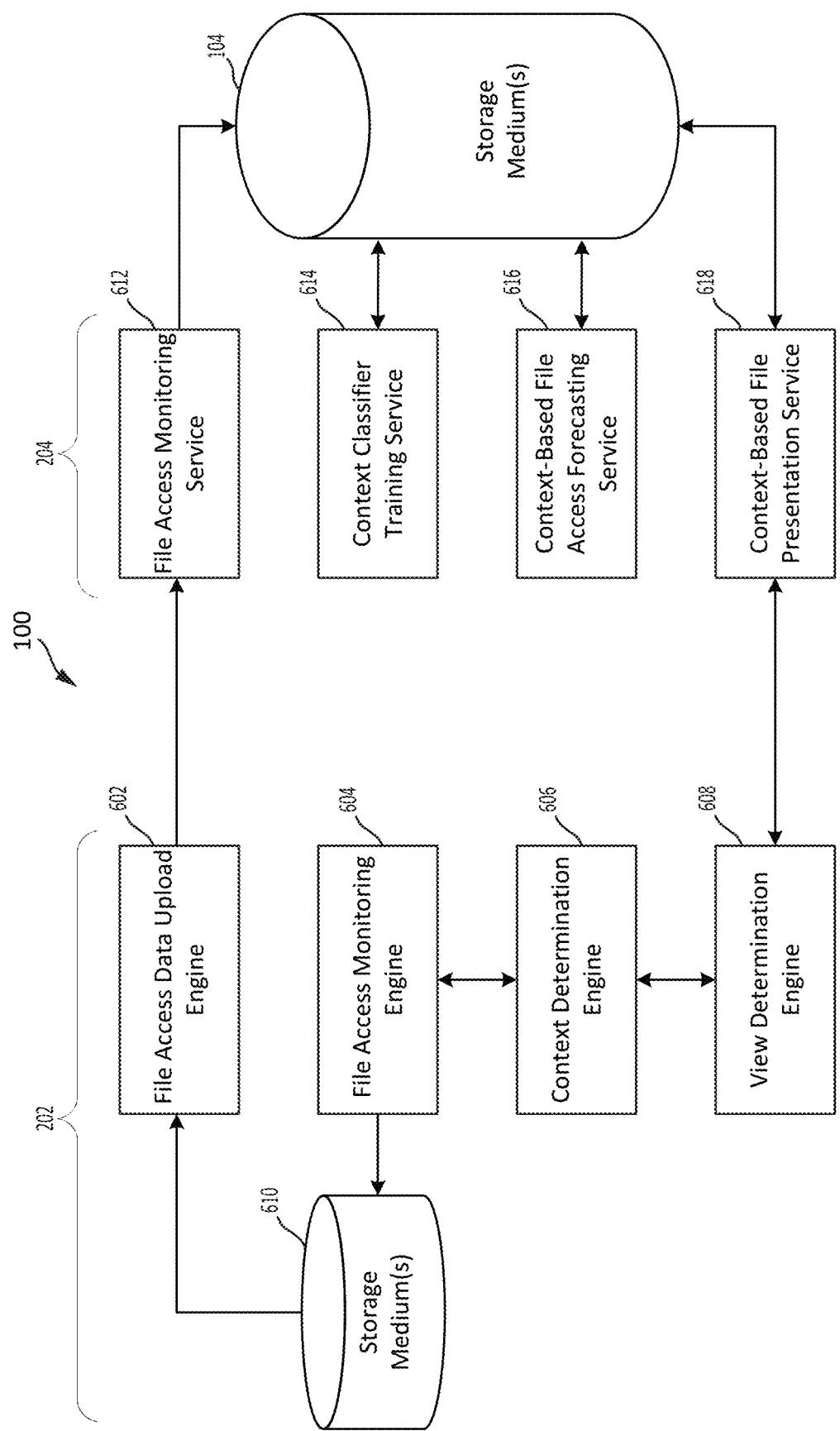
FIG. 6 is a block diagram showing a more detailed example implementation of the intelligent file access system shown in FIG. 1A.

F. Detailed Description of Example Embodiments of the Intelligent File Access System Introduced in Section A FIG. 6 shows example components that may be included in an intelligent file access system 100 such as that introduced above in Section A. As shown, in some implementations, some components of the system 100 may be embodied within the client device(s) 202 and other components of the system 100 may be embodied within the server(s) 204. In particular, as illustrated, in some implementations, the client device(s) 202 may include a file access data upload engine 602, a file access monitoring engine 604, a context determination engine 606, a view determination engine 608, and one or more storage mediums 610. In some implementations, the engines 602, 604, 606 and 608 may, for example, be components of, or operate in conjunction with, the resource access application 522 described above in connection with FIGS. 5B and 5C. Further, as also illustrated in FIG. 6, in some implementations, the server(s) 204 may include a file access monitoring service 612, a context classifier training service 614, a context-based file access forecasting service 616, and a context-based file presentation service 618. In some implementations, the services 612, 614, 616 and 618 may, for example, be included amongst, or operate in conjunction with, the resource management services 502 described above in connection with FIGS. 5B and 5C.

In some implementations, the storage medium(s) 610 may be encoded with instructions which, when executed by one or more processors of the client device(s) 202, may cause the client device(s) 202 to perform the functions of the engines 602, 604, 606, and 608 described herein. Similarly, in some implementations, the storage medium(s) 104 may be encoded with instructions which, when executed by one or more processors of the server(s) 204, may cause the server(s) 204 to perform the functions of the services 612, 614, 616, and 618 described herein.

At a high-level, the file access monitoring engine 604 may monitor file access events of a client device 202, and may create records of such access events in the storage medium(s) 610. In some implementations, a file access event may detected any time an application operating under control of the client device 202 accesses a file. File access events may thus include not only instances in which a user selects a file directly, e.g., by double clicking on an icon for a Microsoft Word file, but also instances in which a file is selected through an operation of a running application (either local or virtual) that is executable on or otherwise accessible to the client device. As described in more detail below, the file access monitoring engine 604 may additionally request current contextual data from the context determination engine 606, and may record such contextual data in the storage medium(s) 610 as part of those created records. As noted in Section A, examples of such contextual data that may be so determined and included in the records include (A) a device ID identifying the particular client device 202 used to access the file, (B) the date and/or time the client device 202 was used to access the file, (C) a network ID identifying the network to which the client device 202 was connected at the time the file was accessed, (D) a location (e.g., latitude and longitude) of the client device 202 at the time it was used to access the file. An example routine 700 that may be performed by the file access monitoring engine 604 is described below in connection with FIGS. 7A and 7B. An example routine 800 that may be performed by the context determination engine 606 is described below in connection with FIG. 8.

The file access data upload engine 602 may be responsible for uploading the new records created by the file access monitoring engine 604 from the storage medium(s) 610 to the file access monitoring service 612. As explained below, in some implementations, such record uploads may be performed periodically, e.g., once per day, at a time when the computational load on the client device 202 is low. An example routine 900 that may be performed by the file access data upload engine 602 is described below in connection with FIG. 9.

The file access monitoring service 612 may receive the records, including the contextual data determined by the context determination engine 606, that are uploaded from the file access data upload engine 602, and may write those records to the storage medium(s) 104, e.g., as rows in one or more tables. An example routine 1000 that may be performed by the file access monitoring service 612 is described below in connection with FIG. 10. An example table 1100 that may be populated with data for respective file access events, including empty fields for context tags 118 that are to be subsequently determined by the context-based file access forecasting service 616 (as explained below), is described below in connection with FIG. 11.

The context classifier training service 614 may be responsible for training and/or updating the predictive model 114 that is used by the context-based file access forecasting service 616 and the context-based file presentation service 618, as explained below. An example routine 1200 that may be performed by the context classifier training service 614 is described below in connection with FIG. 12. Example techniques that may be used to train the predictive model 114 using a collection of contextual data samples, as well as to use the predictive model 114 to determine a context tag 118 for a given contextual data sample, are described below in connection with FIG. 13.

The context-based file access forecasting service 616 may be responsible for calculating context-based file access forecast scores that can subsequently be used by the context-based file presentation service 618 to determine one or more files that are to be included in a context-based file list 150 generated for a client device 202, based on the current contextual situation of that client device 202. For example, as explained below, in some implementations, the context-based file access forecasting service 616 may periodically (e.g., once per day): (A) select a subset of the data in the table 1100 that is to be used for file access forecasting purposes (e.g., data from the past twenty days), (B) use the predictive model 114 to update the context tags 118 for the respective contextual data samples, and (C) use the selected/updated records to calculate context-based file access forecast scores for the respective file ID/device ID/context tag combinations in the table 1100. An example routine 1400 that may be performed by the context-based file access forecasting service 616 is described below in connection with FIG. 14. An example table 1500 populated with context-based notification forecast scores (determined by the context-based file access forecasting service 616) for a given user (i.e., the user 524 with user ID "U1") is described below in connection with FIG. 15.

The view determination engine 608 of the client device(s) 202 and the context-based file presentation service 618 of the server(s) 204 may operate together to present a user 524 of a client device 202 with a context-based file list 150. In particular, in some implementations, the view determination engine 608 may determine that a context-based file list 150 has been requested (e.g., by detecting selection of a "context-based" option via the user interface element 148, as shown in FIG. 1C). In response to making such a determination, the view determination engine 608 may acquire current contextual data (e.g., from the context determination engine 606) and may send a request for a context-based file list 150 to the context-based file presentation service 618, together with the determined contextual data.

Upon receiving the request for a context-based file list 150 and the current contextual data from the client device 202, the context-based file presentation service 618 may use the predictive model 114 to determine a context tag 118 for the current contextual data. For example, the context-based file presentation service 618 may encode the received contextual data into a feature vector 116 and then feed that feature vector 116 to the predictive model 114 to as to yield a context tag 118 based on the current contextual data. Alternatively, in some implementations, the predictive model 114, when generated and/or updated, may be provided to the client device(s) 202, so as to enable the client device(s) 202 to instead determine the context tags 118 for respective contextual data samples. In any event, once context-based file presentation service 618 has the context tag 118 based on the current contextual data, the context-based file presentation service 618 may reference the table 1500 to identify the files that are to be included in the context-based file list 150, as requested. In some implementations, the rows in the table 1500 including the device ID of the client device 202 requesting a context-based file list 150 may be identified, and the column of the table 1500 corresponding to the determined context tag 118 for the current contextual information may be consulted to determine context-based file access forecast scores for the identified rows. In some implementations, the files (e.g., as indicated by respective "File IDs") for which such context-based file access forecast scores are higher than a threshold value may be selected as the files that are to be included in the requested context-based file list 150. For example, for the context-based file access forecast scores shown in the table 1500, if the client device 202 requesting the list 150 was assigned device ID "D1," the threshold score was "2," and the current contextual data was assigned context tag "A," then files "F1" and "F3" would both be selected for inclusion in the requested context-based file list 150, because the context-based file access scores (i.e., "23" and "3") for the "F1/D1" and "F3/D1" file/device combinations are both greater than the threshold of "2." If, on the other hand, the client device 202 requesting the list 150 was assigned device ID "D1," the threshold score was "2" and the current contextual data was assigned context tag "C," then file "F3", but not the file "F1," would not be selected for inclusion in the requested context-based file list 150, because the context-based file access score (i.e., "0") for the "F1/D1" file/device combination (per table entry 1518) is less than the threshold of "2."

After the context-based file presentation service 618 has determined pertinent files for the client device 202 requesting the context-based file list 150, e.g., based on the entries in the table 1500, the context-based file presentation service 618 may generate the context-based file list 150. The context-based file presentation service 618 may then send that context-based file list 150 to the client device 202 for presentation to a user 524, e.g., as shown in the screen 152 (FIG. 1C). In some implementations, the context-based file access forecast scores (e.g., in the table 1500) may further be used to determine the order in which the identified files appear in the context-based file list 150. For example, in some implementations, the identified files with higher context-based file access forecast scores in the table 1500 may, in at least some circumstances, appear earlier in context based file list 150 than those with lower context-based file access forecast scores. An example routine 1600 that may be performed by the view determination engine 608 is described below in connection with FIG. 16. An example routine 1700 that may be performed by the context-based file presentation service 618 is described below in connection with FIG. 17.

Figure 7:
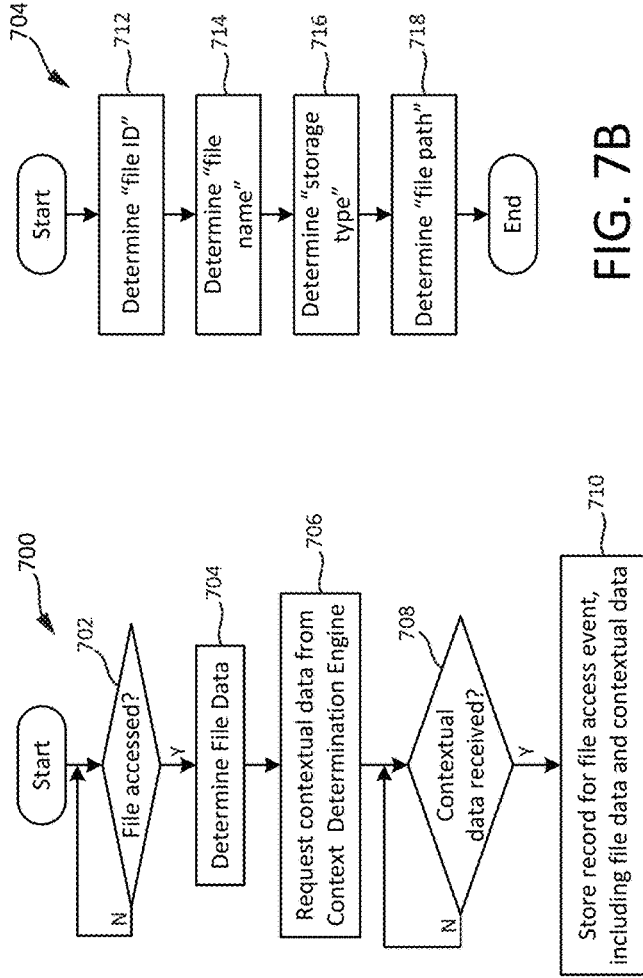
FIG. 7A shows an example routine that may be performed by the file access monitoring engine shown in FIG. 6.
FIG. 7B shows an example implementation of one of the steps of the routine shown in FIG. 7A.
Figure 8:
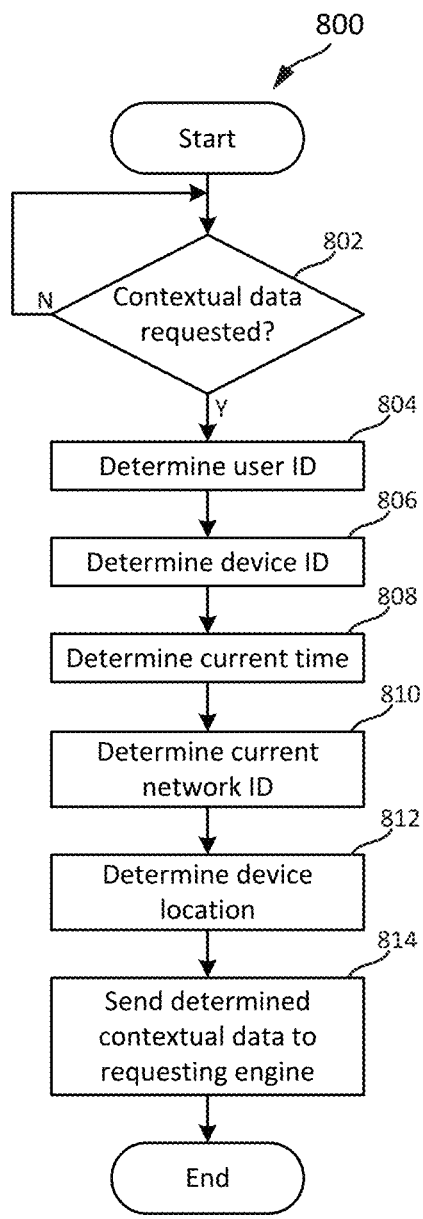
FIG. 8 shows an example routine that may be performed by the context determination engine shown in FIG. 6.

As noted above, FIG. 7A shows an example routine 700 that may be performed by the file access monitoring engine 604 shown in FIG. 6. FIG. 7B shows an example implementation of one of the steps (i.e., step 704) of the routine 700. As shown in FIG. 7A, the routine 700 may begin at a decision step 702, at which the file access monitoring engine 604 may determine whether a file has been accessed by an application under the control of the client device 202. As noted previously, the application accessing the file and/or the accessed file itself may be either local to or remote from the client device. In some implementations, instances in which a file is accessed as a result of a user's interactions with the resource access application 522 may be detected (e.g., by monitoring mouse and/or keyboard activity corresponding to interactions with particular user interface elements) as file access events at the decision step 702. Referring to FIGS. 1B and 1C, examples of such interactions may include, for example (A) double-clicking on or otherwise selecting an icon or name for a file presented on a screen 144, 152 (e.g., in a file list 146, 150 or in a list presented as a result of navigating a menu of accessible files using the "files" user interface element 556), thus causing a local application or remotely-based application (e.g., a delivered virtual application) under the control of the client device 202 to access the selected file, (B) launching a local or remotely-based application (e.g., by selecting an application to launch by using the "apps" user interface element 572 to navigate to a desired application) and using the launched application to select a file (either local or remote) to be accessed, and (C) interacting with a microapp, e.g., by selecting an action element 548 within a notification 546 or a microapp window, or selecting an action from a list of available actions, e.g., via the "actions" list 554. In some implementations, the file access events detected at the decision step 702 may thus involve accesses to files stored in a local disk of the client device 202, accesses to files stored on one or more network drives that are accessible to the client device 202, and/or accesses to files stored within one or more enterprise or cloud-based file sharing systems, such as ShareFile®, Drop-Box, etc. As indicated, the routine 700 may proceed to a step 704 when such a file access event is detected.

At a step 704 of the routine 700, the file access monitoring engine 604 may determine various items of data concerning the accessed file for subsequent use by the system 100, as described below. Examples of particular items of data concerning the file that may be determined at the step 704 are described below in connection with FIG. 7B.

At a step 706 of the routine 700, the file access monitoring engine 604 may request the context determination engine 606 to determine contextual data about the client device 202 at the time the file was accessed. An example routine 800 that may be employed by the context determination engine 606, as well as examples of contextual data that be determined by that engine, are described below in connection with FIG. 8.

At a decision step 708, the file access monitoring engine 604 may determine whether the requested contextual data has been received from the context determination engine 606. As indicated, the routine 700 may wait for the context determination engine 606 to finish gathering the contextual data about the client device 202 (as described below in connection with FIG. 8), and may proceed to a step 710 when the requested contextual data has been received.

At the step 710 of the routine 700, the file access monitoring engine 604 may store a record locally on the client device 202, e.g., in the storage medium(s) 610 shown in FIG. 6, for the detected file access event. As indicated, such a record may include the file-specific data determined in connection with the step 704 as well as the contextual data received from the context determination engine 606. Storing records locally in this manner may allow the accumulated data to be maintained on the client device 202 until such time as the file access data upload engine 602 is ready to upload the accumulated data to the file access monitoring service 612, as described below in connection with FIG. 9.

As shown in FIG. 7B, pursuant to the step 704 of the routine 700, the file access monitoring engine 604 may, at a step 712, examine metadata of the accessed file to determine a file ID for it. The file ID may, for example, be a global unique identifier (GUID) that has been assigned to the accessed file, or some other identifier to uniquely identify the file within the system 100.

At a step 714, the file access monitoring engine 604 may examine metadata of the accessed file to determine the name assigned to it. As explained below, the determined "file name" may be used to identify the file on a context-based file list 150 in a format that is recognizable to the user 524 of the client device 202.

At a step 716, the file access monitoring engine 604 may determine "storage type" data for the file that identifies the repository in which the accessed file is stored. The "storage type" data may be determined, for example, by the evaluating the command issued by an application to access the file in question to identify within the text of the command a resource from which the file is being accessed. The determined "storage type" data may be used, together with the "file path" data (described in connection with step 718), to indicate the current location of the file within the various storage media that are accessible by the client device 202. In addition, in some implementations, as explained in more detail below, the "storage type" data can be used when updating the context-based file access forecast scores for particular "file ID/device ID" combinations in the table 1500, such as by excluding from such scores file access events for which the file corresponding to the indicated "file ID" was stored locally on a different client device 202, and was thus not accessible by the client device 202 corresponding to the indicated "device ID" when the file access event occurred.

At a step 718, the file access monitoring engine 604 may determine the "file path" for the file within the "storage type" determined at the step 716. Like the "storage type" data, the "file path" data may be determined, for example, by the evaluating the command issued by an application to access the file in question to identify within the text of the command the location of the resource from which the file is being accessed.

As noted previously, FIG. 8 shows an example routine 800 that may be performed by the context determination engine 606 shown in FIG. 6 to determine contextual data concerning the client device 202 at a particular time, such as when a file access event is detected by the file access monitoring engine 604.

At a decision step 802 of the routine 800, the context determination engine 606 may determine whether a request for contextual data has been received from another component, such as the file access monitoring engine 604 (as described above) or the view determination engine 608 (as described below). As indicated, the routine 800 may proceed to a step 804 when such a request is received.

At the step 804, the context determination engine 606 may determine a user ID for the user who is currently operating the client device 202. For example, in some implementations, the user ID may be the user name that the user 524 entered to gain access to resource access application 522. In other implementations, the user ID may be an identification number, separate from such a user name, that is assigned to identify a particular user 524 of the system 100. Since the system 100 may generate context-based file lists 150 on a user-by-user basis, determining user IDs may allow the system 100 to attribute particular file access events to specific users 524.

At the step 806 of the routine 800, the context determination engine 606 may determine a device ID of the client device 202 for which the file access event was detected. The device ID may, for example, have been determined by the resource access application 522 of the client device 202 at the time a user 524 authenticated to the identity service 516, as discussed above in connection FIG. 5B. In some implementations, the device ID may additionally or alternatively be determined using a query to the operating system running on the client device 202. As some users 524 may access files using multiple different client devices 202, e.g., a smartphone, a laptop computer, a desktop computer, etc., the device ID may be used to differentiate amongst file access events by different types of client devices 202.

At the step 808, the context determination engine 606 may determine the current date and/or time, e.g., by recording a value of a calendar and/or clock maintained by or otherwise accessible to the client device 202.

At the step 810, the context determination engine 606 may determine a network ID of the network, if any, to which the client device 202 is currently connected. The network ID may, for example, be determined using a query to the operating system running on the client device 202. In some implementations, the network IDs may include the names and/or identifiers of specific networks to which client devices 202 are connected. In other implementations, the network IDs may additionally or alternatively indicate particular types of networks, such as 3G, 4G, 5G, wired local area network (LAN), wireless LAN, etc., to which such devices are connected.

At the step 812 of the routine 800, the context determination engine 606 may determine the current location of the client device 202. For example, the client device 202 may obtain the current coordinates (e.g., latitude and longitude) from a global positioning system (GPS) chip or other location determination device or system.

At the step 814, the context determination engine 606 may send the contextual data gathered per the steps 804, 806, 808, 810 and 812 to the component that requested it, e.g., the file access monitoring engine 604 (as described above) or the view determination engine 608 (as described below).

Figures 9, 10:
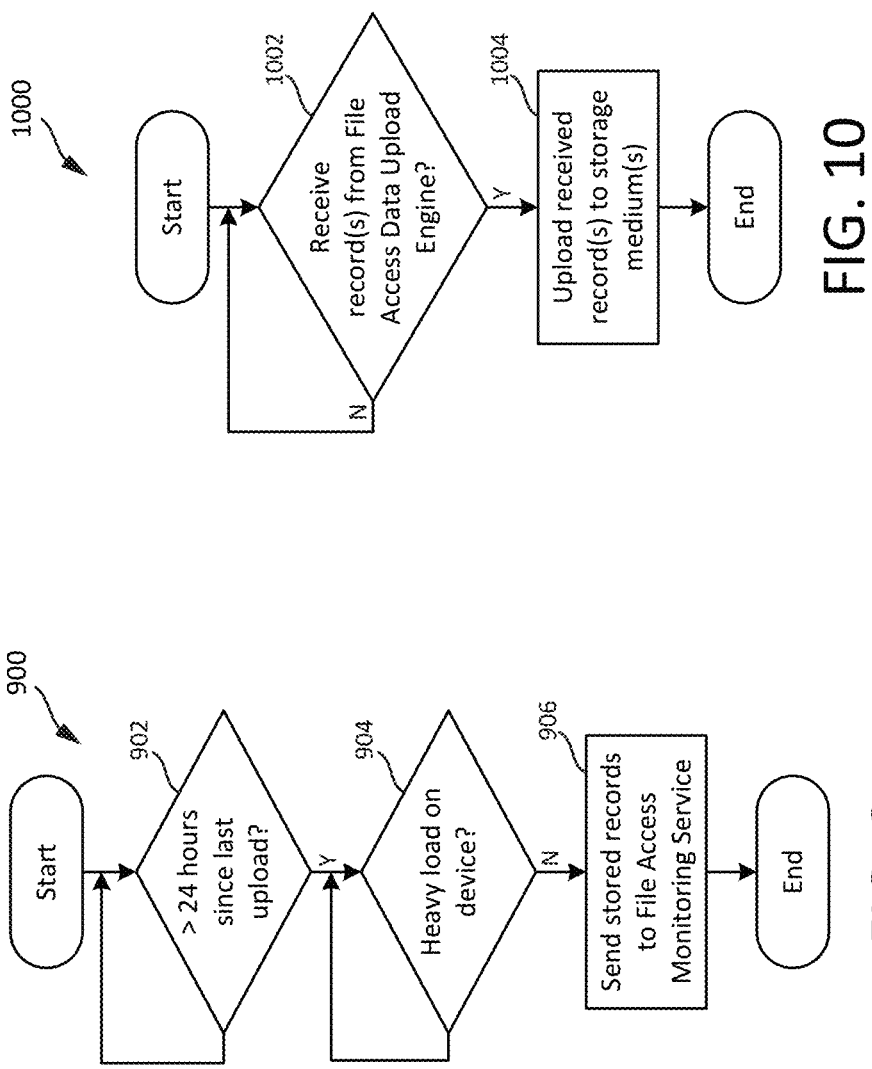
FIG. 9 shows an example routine that may be performed by the file access data upload engine shown in FIG. 6.
FIG. 10 shows an example routine that may be performed by the file access monitoring service shown in FIG. 6.

FIG. 9 shows an example routine 900 that may be performed by the file access data upload engine 602 shown in FIG. 6. As shown, the routine 900 may begin at a decision step 902, at which the file access data upload engine 602 may determine whether a particular period of time, e.g., twenty-four hours, has elapsed since it last uploaded context-specific file access event records to the file access monitoring service 612 (shown in FIG. 6). This may be accomplished, for example, by recording times at which context-specific file access event records are uploaded and determining whether the current time, e.g., as indicated by a calendar and/or clock maintained by or otherwise accessible to the client device 202, is more than twenty-four hours later than the time of the most recent upload. As indicated, the routine 900 may proceed to a decision step 904 when more than the threshold period of time has elapsed.

At the decision step 904, the file access data upload engine 602 may evaluate the current load on the client device 202, such as by determining processing capacity and/or available network bandwidth of the client device 202. The current processing load of the client device 202 may be determined, for example, by using a query to an operating system running on the client device 202. The available network bandwidth for the client device 202 may be determined, for example, by exchanging data with a component of the resource management services 502 and evaluating amounts of data (in bits) sent every second for both upload and download to determine average upload and download speeds. Alternatively, a service, such as the Connection Quality Indicator, offered by Citrix Systems, Inc., of Fort Lauderdale, Fla., may be used to assess the available network bandwidth for the client device 202. As indicated, in some implementations, the file access data upload engine 602 may wait until the load is low, e.g., below a threshold, before proceeding to a step 906, at which it may send the new file access event records it has accumulated (since the last time the routine 900 was performed by the client device 202) to the file access monitoring service 612.

FIG. 10 shows an example routine 1000 that may be performed by the file access monitoring service 612 shown in FIG. 6. As shown, the routine 1000 may begin at a decision step 1002, at which the file access monitoring service 612 may determine whether any new file access event records have been received from the file access data upload engine 602 of client device 202. As noted above, in some implementations, the file access data upload engine 602 may asynchronously determine when such records are sent to the file access monitoring service 612, based on the current load of the client device 202, the currently available bandwidth for the client device 202, or otherwise. The determination made at the decision step 1002 may thus correspond to the file access monitoring service 612 detecting that new records have been received from the file access data upload engine 602 that are in need of processing. As indicated, the routine 1000 may proceed to a step 1004, upon receipt of one or more such new file access event records. At the step 1004, the file access monitoring service 612 may upload the newly-received file access event records to the storage medium(s) 104, e.g., to a database table, as described below.

FIG. 11 shows an example table 1100 that the file access monitoring service 612 may populate with file access event records that are received from file access data upload engine(s) 602 of one or more client devices 202. As shown, the table 1100 may correlate the notification access event records by user ID (per "user ID" entries 1102). In illustrated example, different rows of the table 1100 represent respective file access event records. Further, as indicated, in some implementations, the file access event records, may include "file ID" entries 1104, "file name" entries 1106, "storage type" entries 1108, "file path" entries 1110, "device ID" entries 1112, "time" entries 1114, "network ID" entries 1116, and "location" entries 1118. The table entries 1104, 1106, 1108, and 1110 may, for example, be populated with data concerning accessed files that was collected by the file access monitoring engine 604 (shown in FIG. 6) pursuant to the steps 712, 714, 716 and 718, respectively, of the step/routine 704 shown in FIG. 7B. The table entries 1112, 1114, 1116, and 1118 may, for example, be populated with corresponding items of the contextual data (received from the file access data upload engine 602) that were determined by the context determination engine 606 for the file access events detected by the file access monitoring engine 604 of the client device 202. In some implementations, the right-most entries in the table 1100 (i.e., the "context tag" entries 1120) may be determined and populated by the context-based file access forecasting service 616 (e.g., using the predictive model 114 to evaluate the contextual data for the record), as explained in more detail below.

FIG. 12 shows an example routine 1200 that may be performed by the context classifier training service 614 shown in FIG. 6. As shown, the routine 1200 may begin at a decision step 1202, at which the context classifier training service 614 may determine whether a particular period of time, e.g., twenty days, has elapsed since it last re-trained a predictive model 114 for a user 524 using contextual data of accumulated file access event records for that user 524. As indicated, the routine 1200 may proceed to a step 1204 when it determines that the period of time has elapsed.

At the step 1204, the context classifier training service 614 may select a subset of the accumulated file access event records to use for re-training the user's predictive model 114. In some implementations, for example, the context classifier training service 614 may select the user's file access event records (e.g., as stored in the table 1100) for the prior twenty days for such purpose. At a step 1206, the context classifier training service 614 may use the records selected at the step 1204 to retrain the predictive model 114 for the user 524.

FIG. 13 shows an example technique that the context classifier training service 614 may use to train and/or update a user's predictive model 114, as well as the manner in which the trained predictive model 114 may subsequently be used (e.g., by the context-based file access forecasting service 616 and/or the context-based file presentation service 618) to determine context tags 118 for particular sets of contextual data.

As FIG. 13 illustrates, the contextual data from the selected file access event records may be used as training data 1302 for the machine learning process 110. More specifically, in some implementations, one or more encoders 1304 may encode the various pieces of contextual data from individual records into respective feature vectors 1306a, 1306b, 1306n, so that a total of "n" feature vectors are generated for a set of "n" selected file access event records. In some implementations, the different pieces of contextual data (e.g., the device ID, the time, the network ID, the location, etc.) may be identified as separate "features" of a feature vector 1306, such that, for individual feature vectors 1306, the respective feature values represent different dimensions in a multi-dimensional space. Accordingly, the feature vectors 1306a, 1306b, 1306n, etc., may represent different individual points in the multi-dimensional space.

As shown in FIG. 13, the feature vectors 1306a, 1306b, 1306n may be provided to the machine learning process 110, and the results of the machine learning process 110 may, in turn, be used train the predictive model 114. In some implementations, the machine learning process 110 may employ an unsupervised learning process to train the predictive model 114. For example, in some implementations, the machine learning process 110 may use a clustering process to identify a set of "clusters" of data points within the multi-dimensional space for the feature vectors 1306. Examples of suitable data clustering processes included K-means clustering and density-based spatial clustering of applications with noise (DBSCAN). Any of a number of other data clustering techniques, such as mean-shift clustering, expectation-maximum (EM) clustering using Gaussian mixture models (GMM), and k-nearest neighbor (KNN) classification, may additionally or alternatively be employed in some implementations. As noted above in section A, because such clusters are generally determined based on the relative proximity of the data points in the multi-dimensional space, the data points in a given cluster tend to have similar feature sets as the other data points in that cluster.

After identifying clusters of data points within the multi-dimensional feature space, the machine learning process 110 may train the predictive model 114 to classify a given feature vector 1306x into one of the clusters the machine learning process 110 identified. As explained below, in some implementations, a set of contextual data (e.g., either from a file access event record in the table 1100 or from a request for a context-based file list 150 received from the view determination engine 608) may be provided as new data 1308 to one or more encoders 1310 (which may be the same as, or operate in the same manner as, the encoder(s) 1304). As shown in FIG. 13, the encoder(s) 1310 may encode the received contextual data into the feature vector 1306$x$, and may provide the feature vector 1306$x$ to the predictive model 114 for evaluation. As indicated, the predictive model may then output a cluster ID 1312 identifying the previously-identified cluster into which it has classified the contextual data (i.e., the new data 1308). As explained in more detail below, the cluster ID 1312 output by the predictive model 114 may be used either as the context tag 118 that is written to the table 1100 (e.g., a "context tag" entry 1120) or as the context tag 118 that is used by the context-based file presentation service 618 to identify contextually-relevant files, as explained below.

Figures 14, 15, 17:
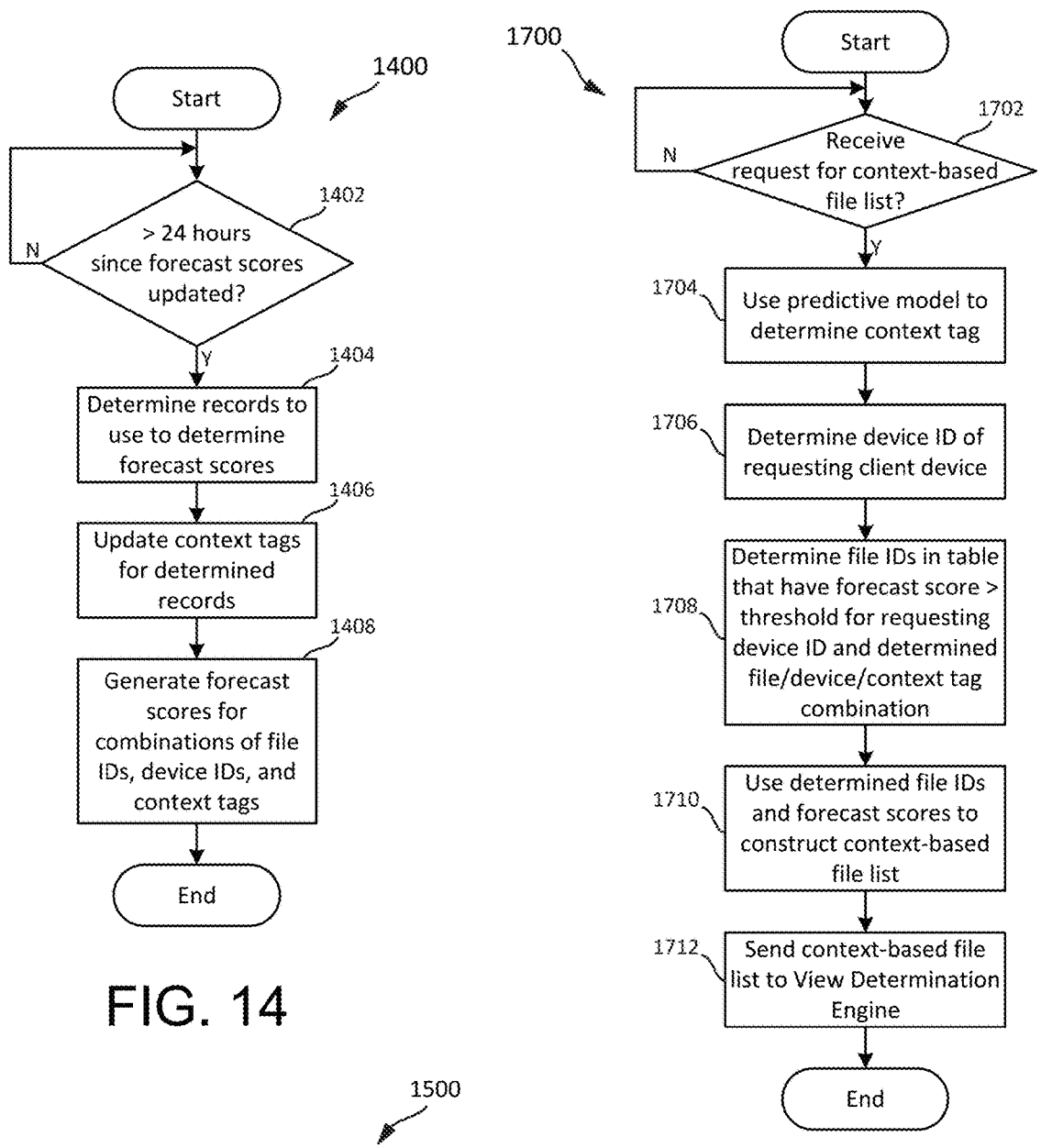
FIG. 14 shows an example routine that may be performed by the context-based file access forecasting service shown in FIG. 6.
FIG. 15 shows an example table that the context-based file access forecasting service shown in FIG. 6 may populate with user-specific context-based notification forecast scores.
FIG. 17 shows an example routine that may be performed by the context-based file presentation service shown in FIG. 6.

FIG. 14 shows an example routine 1400 that may be performed by the context-based file access forecasting service 616 shown in FIG. 6. As shown, the routine 1400 may begin at a decision step 1402, at which the context-based file access forecasting service 616 may determine whether a particular period of time, e.g., twenty-four hours, has elapsed since it last updated the context-based file access forecast scores in the table 1500 (shown in FIG. 15). As indicated, the routine 1400 may proceed to a step 1404 when it determines that the period of time has elapsed.

At a step 1404, the context-based file access forecasting service 616 may determine the file access event records (e.g., from the table 1100) that are to be used to determine the context-based file access forecast stores for the table 1500. In some implementations, for example, the context-based file access forecasting service 616 may identify the file access event records in the table 1100 that were generated less than a threshold period of time (e.g., twenty days) in the past. The "time" entries 1114 in the table 1100 may, for example, be used for that purpose. In some implementations, the threshold time period used to select file access event records at the step 1404 may be the same as the threshold time period that is used to determine (at the decision step 1202 of the routine 1200—shown in FIG. 12) whether to update the predictive model 114. In other implementations, different threshold time periods may be used for those two purposes.

At a step 1406, the context-based file access forecasting service 616 may determine and/or update the context tags 118 in the table 1100 (i.e., the "context tag" entries 1120) for the file access event records selected at the step 1406. With reference to FIGS. 11 and 13, to update a given context tag 118 for a file access event record, the encoder(s) 1310 may be used to encode the stored contextual data for the record, e.g., the device ID, the time, the network ID, and the location, into a feature vector 1306$x$, and may provide that feature vector 1306$x$ to the predictive model 114 for processing. As explained above, because of how the predictive model 114 was trained (using the machine learning process 110), the predictive model 114 may output a cluster ID 1312 that may be used as the (new or updated) context tag 118 for the file access event record under consideration.

At a step 1408, the context-based file access forecasting service 616 may generate and/or update the table 1500 of context-based file access forecast scores using the file access event records that were selected at the step 1404 and for which the context tags 118 were updated at the step 1406. In the illustrated example, the table 1500 shows a set of determined context-based file access forecast scores for the user "U1" (as indicated by the "user ID" entries 1502).

As noted above in Section A, in some implementations, the respective context-based file access forecast scores may simply reflect, for respective file/device combinations represented in the data set being considered, the total number of recorded file access events to which a particular context tag was assigned and for which the indicated file was accessible by the indicated device (e.g., by being stored on a local disk of the indicated device or by being stored on a network drive or in cloud-based file repository that is accessible to the indicated device) when the file access event occurred. For example, an entry 1514 in the table 1500 may reflect that, in the data set under consideration, context tag "C" was assigned to a total of "37" file access event records for file "F3" in circumstances where the file "F3" was accessible by the device "D1." In other implementations, different weights may be applied to different records when determining the context-based file access forecast scores. For example, if records for the last "X" days are being evaluated, lower weights may be applied to older records, so that the more recent records influence the context-based file access forecast scores more than the less recent ones. In some implementations, for example, an exponential moving average (e.g., a first-order infinite response filter that applies weighting factors that decrease exponentially) may be applied to weight the different records differently.

Figure 16:
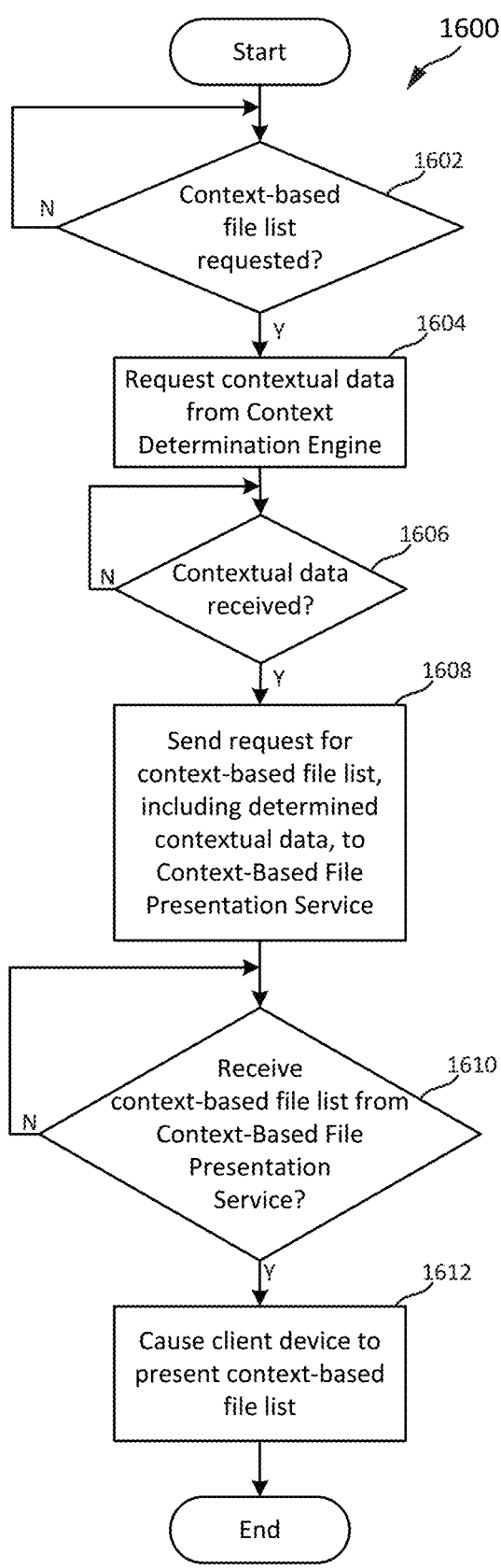
FIG. 16 shows an example routine that may be performed by the view determination engine shown in FIG. 6.

FIG. 16 shows an example routine 1600 that may be performed by the view determination engine 608 shown in FIG. 6. As noted previously, the view determination engine 608 may be located on a client device 202, e.g., as a component of the resource access application 522 shown in FIG. 5C. As shown, the routine 1600 may begin at a decision step 1602, at which the view determination engine 608 may determine whether a user request for a context-based file list 150 has been detected. As discussed above, in some implementations, a user 524 of a resource access application 522 (see FIG. 5C) on a client device 202 may, for example, be presented with an option to request such a context-based file list 150, e.g., via a user interface element 148 on the display screen 152 (see FIG. 1C). As indicated, the routine 1600 may proceed to a step 1604 when it determines that such a context-based file list 150 has been requested.

At the step 1604, the view determination engine 608 may request the current contextual data from the context determination engine 606 (shown in FIG. 6). The manner in which the context determination engine 606 may determine such contextual data, as well as examples of the contextual data that may be so determined, are described above in connection with FIG. 8. In some implementations, the items of contextual data that the context determination engine 606 determines in response to requests from the view determination engine 608 may be the same as those that are determined in response to requests by the file access monitoring engine 604, as described above. For example, similar to the contextual data that the context determination engine 606 accumulated during the file access monitoring process discussed above, examples of contextual data that may be gathered by the context determination engine 606 in response to the request per the step 1604 include (A) a device ID identifying the client device 202 sending the request, (B) the current date and/or time, (C) a network ID identifying the network to which the client device 202 is currently connected, and (D) a current location (e.g., latitude and longitude) of the client device 202.

Per a decision step 1606, the routine 1600 may proceed to a step 1608 when the contextual data has been received from the context determination engine 606 in response to the request sent at the step 1604.

At the step 1608 of the routine 1600, the view determination engine 608 may send a request for a context-based file list 150 to the context-based file presentation service 618 (shown in FIG. 6). As indicated, that request may include the current contextual data that was received from the context determination engine (per the decision step 1606).

At a decision step 1610, the view determination engine 610 may determine whether a context-based file list 150 has been received from the context-based file presentation service 618. As indicated, the routine 1600 may proceed to a step 1612 when the requested context-based file list 150 has been received.

At the step 1612 of the routine 1600, the view determination engine 608 may cause the client device 202 to present the context-based file list 150 that was received from the context-based file presentation service 618, as described below.

FIG. 17 shows an example routine 1700 that may be performed by the context-based file presentation service 618 shown in FIG. 6. As shown, the routine 1700 may begin at a decision step 1702, at which the context-based file presentation service 618 may determine whether a request for a context-based file list 150 has been received from a client device 202. As indicated, the routine 1700 may proceed to a step 1704 when the context-based file presentation service 618 receives such a request. As noted above, such requests for context-based file lists 150 may include the current contextual data that was determined by the context determination engine(s) 606 of the requesting client device(s) 202.

At the step 1704 of the routine 1700, the context-based file presentation service 618 may use the predictive model 114 (shown in FIG. 13) to determine a context tag 118 for the contextual data that was included in the request. As explained above in connection with FIG. 13, the context-based file presentation service 618 may, for example, encode the received contextual data into a context feature vector 116 and may provide that context feature vector 116 to the predictive model 114 for determination of a context tag 118.

At the step 1706 of the routine 1700, the context-based file presentation service 618 may determine the device ID of the client device 202 that requested the context-based file list 150. In some implementation, the device ID from the context data included with the request received at the step 1702 may be used for this purpose.

At a step 1708 of the routine 1700, the context-based file presentation service 618 may evaluate the entries in the table 1500 to determine the files that are to be included in the requested context-based file list 150. In particular, in some implementations, the rows in the table 1500 including the device ID of the client device 202 requesting a context-based file list 150 may be identified, and the column of the table 1500 corresponding to the determined context tag 118 for the current contextual information may be consulted to determine context-based file access forecast scores for the identified rows. In some implementations, the files (e.g., as indicated by respective "File IDs") for which such context-based file access forecast scores are higher than a threshold value may be selected as the files that are to be included in the requested context-based file list 150. For example, for the context-based file access forecast scores shown in the table 1500, if the client device 202 requesting the list 150 was assigned device ID "D1," the threshold score was "2" and the current contextual data was assigned context tag "C," then file "F3" would be selected for inclusion in the requested context-based file list 150, because the context-based file access score (i.e., "37") for that file/device/context tag combination (per entry 1514) is greater than the threshold of "2." If, on the other hand, the client device 202 requesting the list 150 was assigned device ID "D3," the threshold score was "2" and the current contextual data was assigned context tag "C," then file "F4" would not be selected for inclusion in the requested context-based file list 150, because the context-based file access score (i.e., "1") for that file/device/context tag combination (per table entry 1516) is less than the threshold of "2."

At a step 1710 of the routine 1700, the context-based file presentation service 618 may construct a context-based file list 150 using the files identified at the step 1708. In some implementations, the context-based file presentation service 618 may further use the context-based file access forecast scores of the identified files in the table 1500 to determine the order in which the files are to be presented in the context-based file list 150. For example, in some implementations, the identified files having higher context-based file access forecast scores may, in at least some circumstances, be caused to appear earlier in the context-based file list 150 than those with lower context-based file access forecast scores.

At a step 1712 of the routine 1700, the context-based file presentation service 618 may send the context-based file list 150 constructed at the step 1710 to the view determination engine 608 (shown in FIG. 6) for presentation to the user 524 via the screen 152 (e.g., as shown in FIG. 1C).

G. Example Implementations of Methods, Systems, and Computer-Readable Media in Accordance with the Present Disclosure The following paragraphs (M1) through (M13) describe examples of methods that may be implemented in accordance with the present disclosure.

(M1) A method may be performed that involves determining first data indicative of a context of one or more client devices in response to access of a first file by the one or more client devices, the first data being of a first context type; determining, subsequent to the access of the first file by the one or more client devices, second data indicative of a current context of a first client device, the second data being of the first context type; and generating, based at least in part on the first data and the second data being of the first context type, at least one command that causes the first client device to present an indication that the first file is available for access.

(M2) A method may be performed as described in paragraph (M1), and may further involve determining at least a first feature vector representing at least a first portion of the first data; determining a second feature vector representing the second data; determining that the first data is of the first context type at least in part by determining, using a predictive model configured to classify input feature vectors into context types, that the first feature vector is classified as the first context type; and determining that the second data is of the first context type at least in part by determining, using the predictive model, that the second feature vector is classified as the first context type.

(M3) A method may be performed as described in paragraph (M2), and may further involve generating, using a clustering process and a plurality of feature vectors indicative of a context of the one or more client devices at times that the one or more client devices accessed files on respective occasions, the predictive model.

(M4) A method may be performed as described in paragraph (M3), and may further involve determining at least a first one of the plurality of feature vectors in response to determining that the one or more client devices accessed the first file from a first resource; and determining at least a second one of the plurality of feature vectors in response to determining that the one or more client devices accessed a second file from a second resource that is separate and distinct from the first resource.

(M5) A method may be performed as described in any of paragraphs (M2) through (M4), and may further involve determining that at least a threshold number of a first set of feature vectors representing respective portions of the first data have been classified as the first context type; wherein generating the at least one command may be further based at least in part on the threshold number of the first set of feature vectors having been classified as the first context type.

(M6) A method may be performed as described in paragraph (M5), and may further involve determining the first set of feature vectors to include feature vectors for circumstances in which the first file is accessible to the first client device.

(M7) A method may be performed as described in any of paragraphs (M1) through (M6), and may further involve receiving, by a computing system and from the first client device, a request for a context-based file list, the request including the second data; wherein generating the at least one command may comprises generating, by the computing system, the at least one command in response to the request.

(M8) A method may be performed as described in any of paragraphs (M1) through (M7), wherein the second data may comprise at least one of a current time of day, a current day of the week, a network to which the first client device is currently connected, or a current location of the first client device.

(M9) A method may be performed as described in any of paragraphs (M1) through (M8), and may further involve configuring the at least one command to cause the first client device to present at least one user interface element that is selectable to access the first file.

(M10) A method may be performed that involves determining that one or more client devices accessed a first file from a first resource; determining that the one or more client devices accessed a second file from a second resource, the second resource being separate and distinct from the first resource; and generating, based at least in part on the one or more client devices having accessed the first file and the second file, at least one command that causes a first client device to present an indication that the first file and the second file are accessible using the first client device.

(M11) A method may be performed as described in paragraph (M10), wherein the indication may comprise at least a first interface element that is selectable to access the first file and a second user interface element that is selectable to access the second file.

(M12) A method may be performed as described in paragraph (M10) or paragraph (M11), wherein the first resource may be located on the first client device and the second resource may be remote from the first client device.

(M13) A method may be performed as described in any of paragraph (M10) or paragraph (M11), wherein the first resource may be a file sharing system accessible to the first client device over the internet, and the second resource may be located on the first client device or on a network drive accessible to the first client device over a local area network.

The following paragraphs (S1) through (S13) describe examples of systems and devices that may be implemented in accordance with the present disclosure.

(S1) A system may comprise at least one processor and at least one computer-readable medium encoded with instructions which, when executed by the at least one processor, cause the system to determine first data indicative of a context of one or more client devices in response to access of a first file by the one or more client devices, the first data being of a first context type, to determine, subsequent to the access of the first file by the one or more client devices, second data indicative of a current context of a first client device, the second data being of the first context type, and to generate, based at least in part on the first data and the second data being of the first context type, at least one command that causes the first client device to present an indication that the first file is available for access.

(S2) A system may be configured as described in paragraph (S1), wherein the at least one computer-readable medium may be further encoded with additional instructions which, when executed by the at least one processor, further cause the system to determine at least a first feature vector representing at least a first portion of the first data, to determine a second feature vector representing the second data, to determine that the first data is of the first context type at least in part by determining, using a predictive model configured to classify input feature vectors into context types, that the first feature vector is classified as the first context type, and to determine that the second data is of the first context type at least in part by determining, using the predictive model, that the second feature vector is classified as the first context type.

(S3) A system may be configured as described in paragraph (S2), wherein the at least one computer-readable medium may be further encoded with additional instructions which, when executed by the at least one processor, further cause the system to generate, using a clustering process and a plurality of feature vectors indicative of a context of the one or more client devices at times that the one or more client devices accessed files on respective occasions, the predictive model.

(S4) A system may be configured as described in paragraph (S3), wherein the at least one computer-readable medium may be further encoded with additional instructions which, when executed by the at least one processor, further cause the system to determine at least a first one of the plurality of feature vectors in response to determining that the one or more client devices accessed the first file from a first resource, and to determine at least a second one of the plurality of feature vectors in response to determining that the one or more client devices accessed a second file from a second resource that is separate and distinct from the first resource.

(S5) A system may be configured as described in any of paragraphs (S2) through (S4), wherein the at least one computer-readable medium may be further encoded with additional instructions which, when executed by the at least one processor, further cause the system to determine that at least a threshold number of a first set of feature vectors representing respective portions of the first data have been classified as the first context type, and to generate the at least one command further based at least in part on the threshold number of the first set of feature vectors having been classified as the first context type.

(S6) A system may be configured as described in paragraph (S5), wherein the at least one computer-readable medium may be further encoded with additional instructions which, when executed by the at least one processor, further cause the system to determine the first set of feature vectors to include feature vectors for circumstances in which the first file is accessible to the first client device.

(S7) A system may be configured as described in any of paragraphs (S1) through (S6), wherein the at least one computer-readable medium may be further encoded with additional instructions which, when executed by the at least one processor, further cause the system to receive, from the first client device, a request for a context-based file list, the request including the second data, and to generate the at least one command in response to the request.

(S8) A system may be configured as described in any of paragraphs (S1) through (S7), wherein the second data may comprise at least one of a current time of day, a current day of the week, a network to which the first client device is currently connected, or a current location of the first client device.

(S9) A system may be configured as described in any of paragraphs (S1) through (S8), wherein the at least one computer-readable medium may be further encoded with additional instructions which, when executed by the at least one processor, further cause the system to configure the at least one command to cause the first client device to present at least one user interface element that is selectable to access the first file.

(S10) A system may comprise at least one processor and at least one computer-readable medium encoded with instructions which, when executed by the at least one processor, cause the system to determine that one or more client devices accessed a first file from a first resource, to determine that the one or more client devices accessed a second file from a second resource, the second resource being separate and distinct from the first resource, and to generate, based at least in part on the one or more client devices having accessed the first file and the second file, at least one command that causes a first client device to present an indication that the first file and the second file are accessible using the first client device.

(S11) A system may be configured as described in paragraph (S10), wherein the indication may comprise at least a first interface element that is selectable to access the first file and a second user interface element that is selectable to access the second file.

(S12) A system may be configured as described in paragraph (S10) or paragraph (S11), wherein the first resource may be located on the first client device and the second resource may be remote from the first client device.

(S13) A system may be configured as described in any of paragraph (S10) or paragraph (S11), wherein the first resource may be a file sharing system accessible to the first client device over the internet, and the second resource may be located on the first client device or on a network drive accessible to the first client device over a local area network.

The following paragraphs (CRM1) through (CRM13) describe examples of computer-readable media that may be implemented in accordance with the present disclosure.

(CRM1) At least one non-transitory computer-readable medium may be encoded with instructions which, when executed by at least one processor of a system, may cause the system to determine first data indicative of a context of one or more client devices in response to access of a first file by the one or more client devices, the first data being of a first context type, to determine, subsequent to the access of the first file by the one or more client devices, second data indicative of a current context of a first client device, the second data being of the first context type, and to generate, based at least in part on the first data and the second data being of the first context type, at least one command that causes the first client device to present an indication that the first file is available for access.

(CRM2) At least one non-transitory computer-readable medium may be configured as described in paragraph (CRM1), and may be further encoded with additional instructions which, when executed by the at least one processor, further cause the system to determine at least a first feature vector representing at least a first portion of the first data, to determine a second feature vector representing the second data, to determine that the first data is of the first context type at least in part by determining, using a predictive model configured to classify input feature vectors into context types, that the first feature vector is classified as the first context type, and to determine that the second data is of the first context type at least in part by determining, using the predictive model, that the second feature vector is classified as the first context type.

(CRM3) At least one non-transitory computer-readable medium may be configured as described in paragraph (CRM2), and may be further encoded with additional instructions which, when executed by the at least one processor, further cause the system to generate, using a clustering process and a plurality of feature vectors indicative of a context of the one or more client devices at times that the one or more client devices accessed files on respective occasions, the predictive model.

(CRM4) At least one non-transitory computer-readable medium may be configured as described in paragraph (CRM3), and may be further encoded with additional instructions which, when executed by the at least one processor, further cause the system to determine at least a first one of the plurality of feature vectors in response to determining that the one or more client devices accessed the first file from a first resource, and to determine at least a second one of the plurality of feature vectors in response to determining that the one or more client devices accessed a second file from a second resource that is separate and distinct from the first resource.

(CRM5) At least one non-transitory computer-readable medium may be configured as described in any of paragraphs (CRM2) through (CRM4), and may be further encoded with additional instructions which, when executed by the at least one processor, further cause the system to determine that at least a threshold number of a first set of feature vectors representing respective portions of the first data have been classified as the first context type, and to generate the at least one command further based at least in part on the threshold number of the first set of feature vectors having been classified as the first context type.

(CRM6) At least one non-transitory computer-readable medium may be configured as described in paragraph (CRM5), and may be further encoded with additional instructions which, when executed by the at least one processor, further cause the system to determine the first set of feature vectors to include feature vectors for circumstances in which the first file is accessible to the first client device.

(CRM7) At least one non-transitory computer-readable medium may be configured as described in any of paragraphs (CRM1) through (CRM6), and may be further encoded with additional instructions which, when executed by the at least one processor, further cause the system to receive, from the first client device, a request for a context-based file list, the request including the second data, and to generate the at least one command in response to the request.

(CRM8) At least one non-transitory computer-readable medium may be configured as described in any of paragraphs (CRM1) through (CRM7), wherein the second data may comprise at least one of a current time of day, a current day of the week, a network to which the first client device is currently connected, or a current location of the first client device.

(CRM9) At least one non-transitory computer-readable medium may be configured as described in any of paragraphs (CRM1) through (CRM8), and may be further encoded with additional instructions which, when executed by the at least one processor, further cause the system to configure the at least one command to cause the first client device to present at least one user interface element that is selectable to access the first file.

(CRM10) At least one non-transitory computer-readable medium may be encoded with instructions which, when executed by at least one processor of a system, may cause the system to determine that one or more client devices accessed a first file from a first resource, to determine that the one or more client devices accessed a second file from a second resource, the second resource being separate and distinct from the first resource, and to generate, based at least in part on the one or more client devices having accessed the first file and the second file, at least one command that causes a first client device to present an indication that the first file and the second file are accessible using the first client device.

(CRM11) At least one non-transitory computer-readable medium may be configured as described in paragraph (CRM10), wherein the indication may comprise at least a first interface element that is selectable to access the first file and a second user interface element that is selectable to access the second file.

(CRM12) At least one non-transitory computer-readable medium may be configured as described in paragraph (CRM10) or paragraph (CRM11), wherein the first resource may be located on the first client device and the second resource may be remote from the first client device.

(CRM13) At least one non-transitory computer-readable medium may be configured as described in any of paragraph (CRM10) or paragraph (CRM11), wherein the first resource may be a file sharing system accessible to the first client device over the internet, and the second resource may be located on the first client device or on a network drive accessible to the first client device over a local area network.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:

storing, in a storage medium, a plurality of records corresponding to respective occasions on which one or more client devices, operated by a user, accessed individual files of a plurality of files during a historical period of time, the plurality of records including file identifiers indicative of the individual files that were accessed on the respective occasions, and context information indicative of historical contextual states of the one or more client devices on the respective occasions, and wherein the plurality of records includes at least a first record corresponding to a first occasion on which the user operated a first client device to access a first file of plurality of files, the first record including a first file identifier for the first file, and first context information indicative of a first historical contextual state of the first client device on the first occasion;

determining a plurality of feature vectors corresponding to the context information in the plurality of records, each feature vector of the plurality of feature vectors including a set of values representing a data point in a multi-dimensional space, the plurality of feature vectors including a first feature vector corresponding to the first context information;

performing an unsupervised machine learning process to identify clusters of the data points represented by the plurality of feature vectors;

generating a predictive model configured to classify input feature vectors into one of a plurality of context types corresponding to the identified clusters;

classifying, using the predictive model, the first feature vector as a first context type of the plurality of context types;

determining current context information indicative of a current contextual state of an active client device currently being operated by the user;

determining a second feature vector corresponding to the current context information;

classifying, using the predictive model, the second feature vector as the first context type; and generating, based at least in part on (A) the first record including the first file identifier, and (B) the first feature vector and the second feature vector both being classified as the first context type, at least one command that causes the active client device to present an indication that the first file is available for access.

2. The method of claim 1, further comprising:
  determining the first context information for the first record in response to determining that the one or more client devices accessed the first file from a first resource; and
  determining second context information for a second record of the plurality of records in response to determining that the one or more client devices accessed a second file from a second resource that is separate and distinct from the first resource.

3. The method of claim 1, further comprising:
  receiving, by a computing system and from the active client device via a network, a request for a context-based file list, the request including the current context information;
  wherein generating the at least one command comprises generating, by the computing system, the at least one command in response to the request.

4. The method of claim 1, wherein the current context information comprises at least one of a current time of day, a current day of the week, a network to which the active client device is currently connected, or a current location of the active client device.

5. The method of claim 1, further comprising:
  configuring the at least one command to cause the active client device to present at least one user interface element that is selectable to access the first file.

6. The method of claim 1, further comprising:
  determining that at least a threshold number of a first set of the plurality of records (A) include the first file identifier, and (B) include context information corresponding to a feature vector that has been classified as the first context type;
  wherein generating the at least one command is further based at least in part on the threshold number of the first set of the plurality of records (A) including the first file identifier, and (B) including context information corresponding to a feature vector that has been classified as the first context type.

7. The method of claim 6, further comprising:
  determining the first set of the plurality of records to include records corresponding to occasions on which the first file was accessible to the active client device.

8. A method, comprising:
  determining first data indicative of a context of one or more client devices in response to access of a first file by the one or more client devices;
  determining at least a first feature vector representing at least a first portion of the first data;
  determining that the first data is of a first context type at least in part by determining, using a predictive model configured to classify input feature vectors into context types, that the first feature vector is classified as the first context type;
  determining, subsequent to the access of the first file by the one or more client devices, second data indicative of a current context of a first client device;
  determining a second feature vector representing the second data;
  determining that the second data is of the first context type at least in part by determining, using the predictive model, that the second feature vector is classified as the first context type;
  determining that at least a threshold number of a first set of feature vectors representing respective portions of the first data have been classified as the first context type; and
  generating, based at least in part on the first data and the second data being of the first context type and the threshold number of the first set of feature vectors having been classified as the first context type, at least one command that causes the first client device to present an indication that the first file is available for access.

9. The method of claim 8, further comprising:
  determining the first set of feature vectors to include feature vectors for circumstances in which the first file was accessible to the first client device.

10. A system, comprising:
  at least one processor; and
  at least one computer-readable medium encoded with instructions which, when executed by the at least one processor, cause the system to:
    store, in a storage medium, a plurality of records corresponding to respective occasions on which one or more client devices, operated by a user, accessed individual files of a plurality of files during a historical period of time, the plurality of records including file identifiers indicative of the individual files that were accessed on the respective occasions, and context information indicative of historical contextual states of the one or more client devices on the respective occasions, and wherein the plurality of records includes at least a first record corresponding to a first occasion on which the user operated a first client device to access a first file of plurality of files, the first record including a first file identifier for the first file, and first context information indicative of a first historical contextual state of the first client device on the first occasion,
    determine a plurality of feature vectors corresponding to the context information in the plurality of records, each feature vector of the plurality of feature vectors including a set of values representing a data point in a multi-dimensional space, the plurality of feature vectors including a first feature vector corresponding to the first context information,
    perform an unsupervised machine learning process to identify clusters of the data points represented by the plurality of feature vectors,
    generate a predictive model configured to classify input feature vectors into one of a plurality of context types corresponding to the identified clusters,
    classify, using the predictive model, the first feature vector as a first context type of the plurality of context types,
    determine, current context information indicative of a current contextual state of an active client device currently being operated by the user,
    determine a second feature vector corresponding to the current context information,
    classify, using the predictive model, the second feature vector as the first context type, and
    generate, based at least in part on (A) the first record including the first file identifier, and (B) the first feature vector and the second feature vector both being classified as the first context type, at least one command that causes the active client device to present an indication that the first file is available for access.

11. The system of claim 10, wherein the at least one computer-readable medium is further encoded with additional instructions which, when executed by the at least one processor, further cause the system to:

determine the first context information for the first record in response to determining that the one or more client devices accessed the first file from a first resource; and
determine second context information for a second record of the plurality of records in response to determining that the one or more client devices accessed a second file from a second resource that is separate and distinct from the first resource.

12. The system of claim 10, wherein the current context information comprises at least one of a current time of day, a current day of the week, a network to which the active client device is currently connected, or a current location of the active client device.

13. The system of claim 10, wherein the at least one computer-readable medium is further encoded with additional instructions which, when executed by the at least one processor, further cause the system to:
configure the at least one command to cause the active client device to present at least one user interface element that is selectable to access the first file.

14. The system of claim 10, wherein the at least one computer-readable medium is further encoded with additional instructions which, when executed by the at least one processor, further cause the system to:
receive, from the active client device via a network, a request for a context-based file list, the request including the current context information; and
generate the at least one command in response to the request.

15. The system of claim 10, wherein the at least one computer-readable medium is further encoded with additional instructions which, when executed by the at least one processor, further cause the system to:
configure the at least one command to cause the active client device to present at least one user interface element that is selectable to access the first file.

16. The system of claim 10, wherein the at least one computer-readable medium is further encoded with additional instructions which, when executed by the at least one processor, further cause the system to:
determine that at least a threshold number of a first set of the plurality of records (A) include the first file identifier, and (B) include context information corresponding to a feature vector that has been classified as the first context type; and
generate the at least one command further based at least in part on the threshold number of the first set of the plurality of records (A) including the first file identifier, and (B) including context information corresponding to a feature vector that has been classified as the first context type.

17. The system of claim 16, wherein the at least one computer-readable medium is further encoded with additional instructions which, when executed by the at least one processor, further cause the system to:
determine the first set of the plurality of records to include records corresponding to occasions on which the first file was accessible to the active client device.

18. A system, comprising:
at least one processor; and
at least one computer-readable medium encoded with instructions which, when executed by the at least one processor, cause the system to:
determine first data indicative of a context of one or more client devices in response to access of a first file by the one or more client devices,
determine at least a first feature vector representing at least a first portion of the first data,
determine that the first data is of a first context type at least in part by determining, using a predictive model configured to classify input feature vectors into context types, that the first feature vector is classified as the first context type,
determine, subsequent to the access of the first file by the one or more client devices, second data indicative of a current context of a first client device,
determine a second feature vector representing the second data,
determine that the second data is of the first context type at least in part by determining, using the predictive model, that the second feature vector is classified as the first context type,
determine that at least a threshold number of a first set of feature vectors representing respective portions of the first data have been classified as the first context type, and
generate, based at least in part on the first data and the second data being of the first context type and the threshold number of the first set feature vectors having been classified as the first context type, at least one command that causes the first client device to present an indication that the first file is available for access.

19. The system of claim 18, wherein the at least one computer-readable medium is further encoded with additional instructions which, when executed by the at least one processor, further cause the system to:
determine the first set of feature vectors to include feature vectors for circumstances in which the first file was accessible to the first client device.

* * * * *